US009778099B2

(12) United States Patent
Allen et al.

(10) Patent No.: US 9,778,099 B2
(45) Date of Patent: Oct. 3, 2017

(54) SYSTEM AND METHOD OF ESTIMATING SPECTRAL CONTRIBUTIONS IN AMBIENT LIGHT AND CORRECTING FIELD OF VIEW ERRORS

(71) Applicant: Maxim Integrated Products, Inc., San Jose, CA (US)

(72) Inventors: Dan G. Allen, Cupertino, CA (US); Cheng-Wei Pei, Belmont, CA (US); Richard I. Olsen, Truckee, CA (US); Rudi Hechfellner, Campbell, CA (US)

(73) Assignee: Maxim Integrated Products, Inc., San Jose, CA (US)

( * ) Notice: Subject to any disclaimer, the term of this patent is extended or adjusted under 35 U.S.C. 154(b) by 68 days.

(21) Appl. No.: 14/710,655

(22) Filed: May 13, 2015

(65) Prior Publication Data
US 2016/0041035 A1    Feb. 11, 2016

Related U.S. Application Data

(60) Provisional application No. 62/033,280, filed on Aug. 5, 2014.

(51) Int. Cl.
*G01J 1/42*       (2006.01)
*G01J 1/02*       (2006.01)
(Continued)

(52) U.S. Cl.
CPC .......... *G01J 1/0233* (2013.01); *G01J 1/0266* (2013.01); *G01J 1/08* (2013.01); *G01J 1/429* (2013.01);
(Continued)

(58) Field of Classification Search
CPC .................... G01J 2001/428; G01J 2001/4266
See application file for complete search history.

(56) References Cited

U.S. PATENT DOCUMENTS

| 7,148,489 B2 | 12/2006 | Yagi | |
| 2005/0236576 A1* | 10/2005 | Yagi | G01J 1/429 |
| | | | 250/372 |

(Continued)

OTHER PUBLICATIONS

A. Jos Van Geffen and R. Van Der; "UV radiation monitoring: UV index and UV dose"; Oct. 2, 2012; Online; http://www.temis.nl/uvradiation/info/uvindex.html; Accessed 2014.
(Continued)

*Primary Examiner* — Shawn DeCenzo
(74) *Attorney, Agent, or Firm* — Advent, LLP

(57) ABSTRACT

The present disclosure describes systems, methods, and devices for estimating spectral contributions in ambient light. The present disclosure also describes systems, methods, and devices for compensating for field of view errors resulting from the user, contextual structures (e.g., buildings, trees, fixtures, or geological formations), atmospheric effects (e.g., ozone coverage, smog, fog, haze, or clouds), device structures, and/or device orientation/tilt relative to a light source being measured (e.g., sun, indoor/outdoor light emitter, or an at least partially reflective surface). The present disclosure also describes systems, methods, and devices for estimating spectral contributions in light or color measurements and accounting for field of view errors to obtain a refined estimate.

11 Claims, 20 Drawing Sheets

(51) Int. Cl.
*G01J 1/08* (2006.01)
*G01J 3/28* (2006.01)

(52) U.S. Cl.
CPC .............. *G01J 1/4228* (2013.01); *G01J 3/28* (2013.01); *G01J 2001/4266* (2013.01)

(56) References Cited

U.S. PATENT DOCUMENTS

| | | | | |
|---|---|---|---|---|
| 2011/0273704 | A1* | 11/2011 | Burba | G01J 1/04 356/222 |
| 2014/0092238 | A1* | 4/2014 | Sandhu | G01J 1/429 348/135 |
| 2014/0167619 | A1* | 6/2014 | Land | G01J 1/44 315/152 |
| 2014/0374600 | A1* | 12/2014 | Gokingco | G01J 1/0295 250/340 |

OTHER PUBLICATIONS

F. Huag; "Irradiation spectrum"; 2009; Online; http://www.superstrate.net/pv/illumination/spectrum.html; Accessed 2014.
G. R. Casale, D. Meloni, S. Miano, S. Palmieri, A. M. Siani, F. Cappellani; "Solur UV-B irradiance and total ozone in Italy: Fluctuations and trends"; Feb. 27, 2000; Journal of Geophysical Research: Atmospheres; DOI: 10.1029/1999JD900303; Abstract.
Richard D. McPeters, Gordon J. Labow; "Climatology 2011: An MLS and sonde derived ozone climatology for satellite retrieval algorithms"; May 23, 2012; Journal of Geophysical Research: Atmospheres; DOI: 10.1029/2011JD017006.

* cited by examiner

SYSTEM AND METHOD OF ESTIMATING SPECTRAL CONTRIBUTIONS IN AMBIENT LIGHT AND CORRECTING FIELD OF VIEW ERRORS

CROSS-REFERENCE TO RELATED APPLICATIONS

The present application claims the benefit under 35 U.S.C. §119(e) of U.S. Provisional Application Ser. No. 62/033,280, entitled SYSTEM AND METHOD OF ESTIMATING SOLAR SPECTRAL CONTRIBUTIONS IN AMBIENT LIGHT, filed Aug. 5, 2014. U.S. Provisional Application Ser. No. 62/033,280 is hereby incorporated by reference in its entirety.

BACKGROUND

Ultraviolet (UV) light affects the human body in both beneficial (e.g., vitamin D and tanning) and detrimental (e.g., skin wrinkling, skin cancer, and sun burn or erythema) ways. UV light is typically more difficult to measure than visible and near infrared light because the spectral content is much weaker than visible light and the short wavelength provides an abundance of challenges for detection systems. In both UV and visible light systems optical filters are typically angle sensitive, where the passband shifts to shorter wavelengths at higher angles of incidence, limiting the useful field of view of a sensor. Solutions are desirable for converting a measured spectrum to a desired spectrum by compensating for the difference between a measured and target spectrum as well as the difference in desired field of view.

The UV spectrum is made up of three regions: UVA, UVB and UVC. Solar UVC radiation is blocked by the earth's atmosphere. Solar UVB light is partially blocked by the stratospheric ozone layer, and UVA light largely transmits. Both UVA and UVB light experience significant Rayleigh scattering, the phenomenon responsible for making the sky blue. The UVB spectral range (~280-315 nm) includes shorter wavelengths than the UVA spectral range (~315-400 nm) and is mostly responsible for sunburn, carcinoma of the skin and vitamin D generation. UVA includes longer wavelengths that cause tanning, freckles and skin aging effects.

The shorter wavelengths of UV light pose challenges for efficient detection with common photodiode materials. To detect UV light, either a special shallow junction photodiode in a typical Optoelectronic material such as silicon can be used, such as a lateral junction on SOI or a lower volume supply, wide bandgap material (e.g., SiC or AlGaN). In this context, measuring UVB is much more challenging than measuring UVA. Most optical window or lens materials are highly or partially transmissive to UVA. Few are highly transmissive to UVB, and they are usually more expensive. Additionally UVA is 20% bandwidth and UVB is 10% bandwidth, which makes optical filter design more challenging for UVB and more susceptible to angle-dependency. Additionally, the filter layers are thinner and thickness control tolerances rapidly become critical to a costly degree. Lastly and most importantly, there is very little UVB in the solar spectrum at any given time, approximately 0-4% of the total UV radiation depending on the atmospheric conditions. For example, FIG. 5 shows a spectral photocurrent response of a lateral junction photodiode with visible blocking filter overlaid with a solar spectrum. As can be seen in FIG. 5, the UVB spectral contributions to the detected light are much lower than the UVA spectral contributions.

UVB is not only hard to measure with a detector; it is also challenging to manufacture a UVB detector in a cost-effective manner due to the tight tolerances needed for filter response, dopant profile, field of view, surface states, strain, and the like. Poor responsivity for narrower bandgap detectors like silicon is compounded by higher dark current. In addition, manufacturing issues abound for wide bandgap semiconductors, particularly dislocation density and yield. In both cases the requisite large area and preference for a diffuser to limit angle-sensitivity of the optical filter magnify the detector sizes and system cost. Trimming and/or calibrating a UVB detector also requires a UVB light source (preferably broadband), such as a Xenon lamp. These light sources tend to be large, bulky costly, noisy, and high maintenance.

Finally, (unless heavily diffused) a typical optical detector has a field of view (FOV) limited by the optical package. UV Index is defined for an ideal planar detector (e.g., having at least 120 degree FOV). A method is needed to relate narrow FOV (e.g., ≤90 degrees) UVA or total UV measurements to what would be measured by a wide FOV UVB or erythema action spectrum weighted detector. A high accuracy solution for estimation of biologically relevant spectral contributions (e.g., human-health relevant UV Index or CIE 1931 XYZ color values) is also desirable with a manufacturable detection system for mobile consumer applications, among others.

SUMMARY

The present disclosure describes systems, methods, and devices for estimating spectral contributions in ambient light. The present disclosure also describes systems, methods, and devices for compensating for field of view errors resulting from the user, contextual structures (e.g., buildings, trees, fixtures, or geological formations), atmospheric effects (e.g., ozone coverage, smog, fog, haze, or clouds), device structures, and/or device orientation/tilt relative to a light source being measured (e.g., sun, indoor/outdoor light emitter, or an at least partially reflective surface). The present disclosure also describes systems, methods, and devices for estimating spectral contributions in light or color measurements and accounting for field of view errors to obtain a refined estimate.

In some implementations, a method of estimating spectral contributions in ambient light includes: receiving a light measurement of a mobile device, the light measurement having a spectral response; receiving a location and a time associated with the light measurement of the mobile device; providing a spectral correction factor appropriate to the location and the time associated with the light measurement of the mobile device; and scaling the light measurement of the mobile device by the spectral correction factor to obtain a target measure.

In some implementations, a method of correcting field of view errors affecting light or color measurements includes: receiving a light or color measurement of a mobile device, the light or color measurement being associated with a first field of view; detecting light within two or more differing fields of view; and scaling the light or color measurement of the mobile device with a correction factor based upon the detected light within the two or more differing fields of view.

One or more of the methods described above may be manifested as a system for estimating spectral contributions in ambient light. In some embodiments, the system may include a first sensor configured to detect light within a first field of view. One or more processors in communication with the first sensor may be configured to: receive a light measurement via the first sensor, the light measurement having a spectral response; receive a location and a time associated with the light measurement of the first sensor; provide a spectral correction factor appropriate to the location and the time associated with the light measurement of the first sensor, and scale the light measurement of the first sensor by the spectral correction factor to obtain a target measure.

In some embodiments, the system may include a second sensor configured to detect light within a second field of view different from a first field of view of the light measurement. The system may further include a third sensor configured to detect light within a third field of view different from the first and second fields of view. The one or more processors may be communicatively coupled with the second and third sensors and may be configured to scale the light measurement of the first sensor with a field of view correction factor based upon the detected light within the second and third fields of view. In some embodiments, the system can further include additional sensors (e.g., fourth, fifth, and so forth) with differing fields of view, where the correction factor is based on measurements from some or all of the secondary sensors.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DRAWINGS

The Detailed Description is described with reference to the accompanying figures. The use of the same reference numbers in different instances in the description and the figures may indicate similar or identical items.

DETAILED DESCRIPTION

Overview

Figure 6:
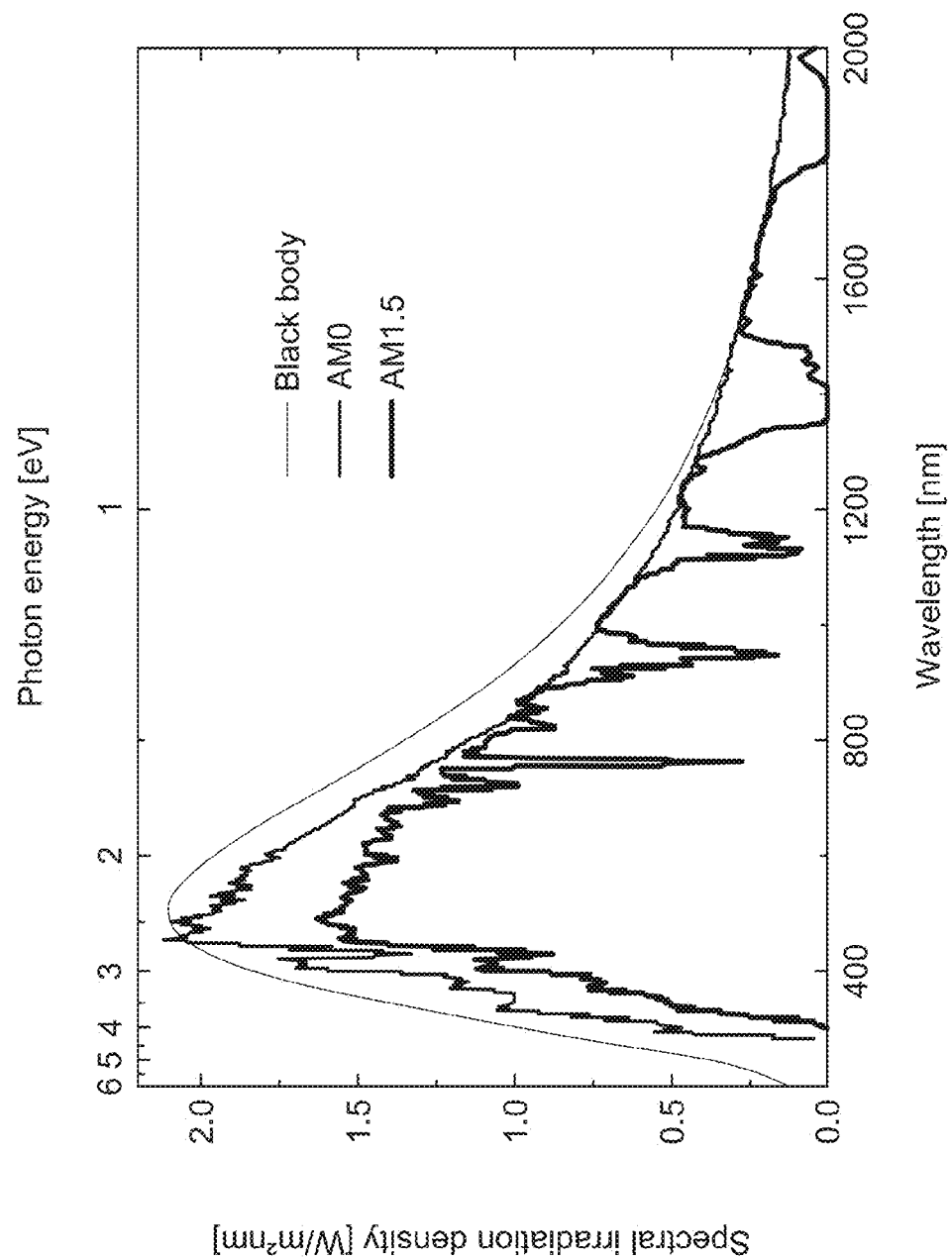
FIG. 6 is a graph showing an exemplary solar spectrum from space (AM0) and at the earth's surface (AM1.5), relative to an ideal 5800K blackbody emitter.

Ultraviolet (UV) light is broken into several spectral bands. UVC radiation is blocked by the earth's atmosphere, while the atmosphere transmits the UVB (~280-315 nm) and UVA (~315-400 nm) spectral bands to a varying degree. A typical solar spectrum is shown in FIG. 6, illustrating an exemplary solar spectrum from space (AM0) and at the earth's surface (AM1.5), relative to an ideal 5800K blackbody emitter. Traditionally measurement of UV, including UV Index has been challenging, with even best-in-class scientific instrumentation delivering only ±5-10% accuracy. This is due in part to the small UV-to-visible ratio in sunlight, the use of exotic wide bandgap materials available at lower volumes than ubiquitous silicon detectors, extreme requirements for sensor spectral accuracy including slope control and extinction ratio, lack of stable high power and broadband light sources, and a host of critical system integration issues including sensor field of view. Sensor field of view dependence plays a critical role in color measurement as well.

According to various embodiments of the present disclosure, a cross-cut approach to UV index measurement is enabled utilizing sensor fusion and an elegant single wideband UV sensor approach. This UV Index sensing solution removes complexity from the hardware by integrating intelligent algorithms that accurately predict and account for variation in solar spectrum and intensity across the globe, at all altitudes and in every season, and a hardware solution for dynamically increasing the effective field of view (FOV) on demand. By combining the capability of various sensors that are often already in mobile devices with the reliable, cost effective, and ultra-high volume manufacturable, low part variation wideband UV sensor solution, the disclosed systems and methods enable mobile device manufactures (e.g., smartphone, tablet, notebook, smartwatch, media player manufactures, and the like) to provide a UV or visible light sensor with accuracy approaching scientific quality for orders of magnitude less cost and size.

In some embodiments, spectral contributions are determined by weighting measured UV counts according to theoretical models and contextual information including, but not limited to, one or more of: time, location, altitude, orientation, pressure, and ozone mapping. For example, the following is considered. UVA represents the majority 95-100% of the solar UV content and is most responsible for skin effects such as tanning and aging (wrinkles). UVB at the earth's surface comprises only a few percent of the total UV content in sunlight (varying with time of day), yet UVB is most responsible for sunburn and cancer due to the ionizing nature of the higher energy photons which can damage DNA. The output signal of some UV sensors, such as the MAX86902 sensor, include contributions from both UVA and UVB. Time and location information (and/or other contextual information) can be used in conjunction with a spectral response model to determine how much of the signal is due to UVA, UVB, or a similar biologically-relevant metric like UV Index.

Example Implementations

FIGS. 1 through 19 illustrate various embodiments and implementations of systems, methods, and devices for estimating spectral contributions in ambient light and/or correcting field of view errors affecting light measurements. Those skilled in the art will appreciate that the embodiments illustrated in the drawings and/or described herein may be fully or partially combined to result in additional embodiments. Accordingly, the illustrated and described embodiments should be understood as explanatory and not as limitations of the present disclosure.

Figure 1:
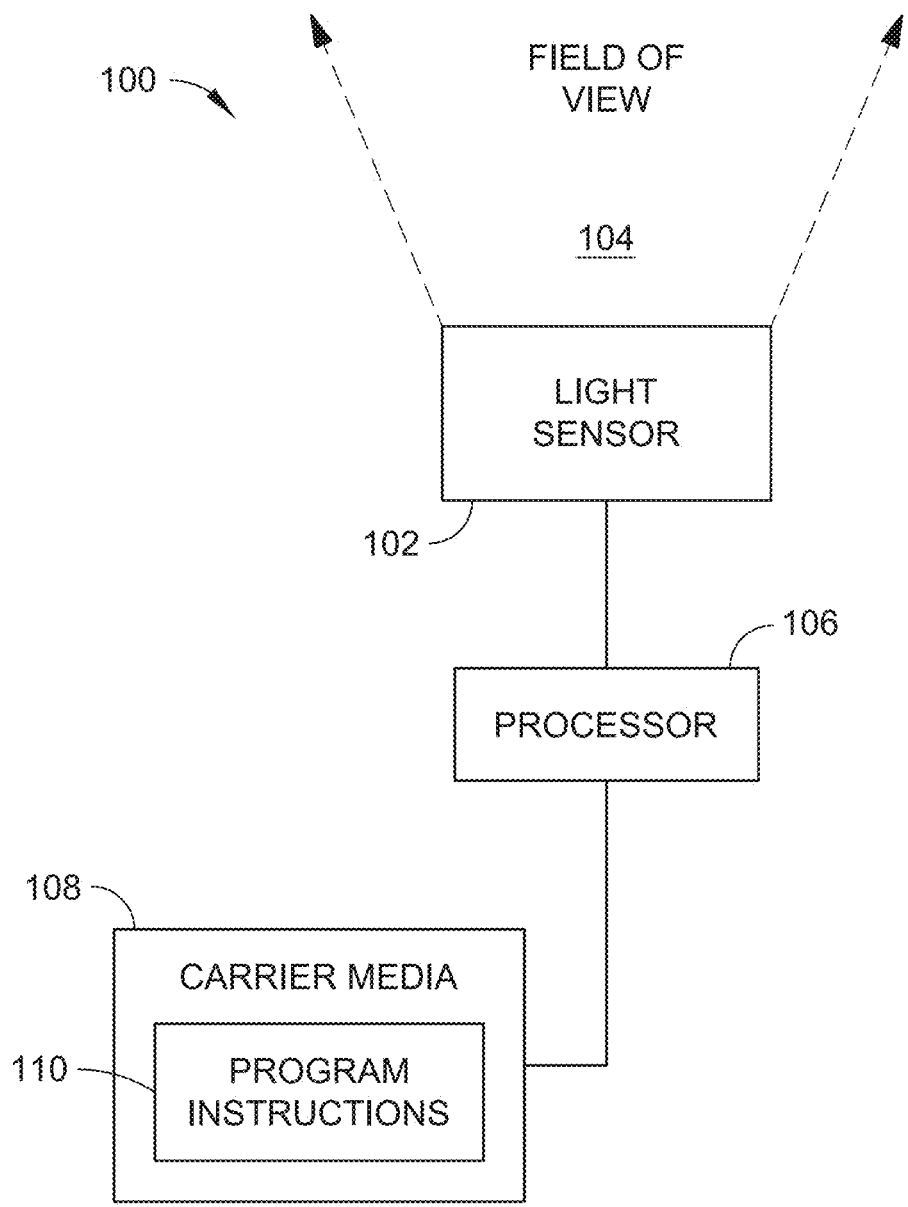
FIG. 1 is a block diagram illustrating a system for estimating spectral contributions in ambient light in accordance with an embodiment of the present disclosure.

FIG. 1 shows an embodiment of a system 100 including at least one sensor 102 configured to detect light within a first FOV 104. One or more processors 106 in communication with the sensor 102 may be configured to execute program instructions 110 stored by at least one carrier medium 108 to carry out a process of estimating spectral contributions based on detected light (e.g., measured UV counts) by the sensor 102 and contextual information retrieved from or determined via a communicatively coupled local or remote device (e.g., GNSS, timer, altimeter, accelerometer or other motion sensor, pressure sensor, or the like) and/or retrieved from a local or remote database. For example, contextual information may be retrieved via direct link or wireless link (e.g., IP protocol, satellite-based communication, radio-based communication, cell phone tower, Bluetooth beacon, or the like). Possible location determination architectures include, but are not limited to: a separate position sensor in communication with the one or more processors 106, where a location determination algorithm is run by the one or more processors 106; a separate position sensor in communication and a state machine (e.g., programmable logic device) with a hard coded location determination algorithm; an integrated sensor and an ASIC; an integrated sensor and an ASIC with the ASIC and the one or more processors 106 each running a portion of the location determination algorithm; or a separate sensor and front end processor that fees partially processed (e.g., pre-processed) data to the one or more processors 106.

The one or more processors 106 may be configured to receive a light measurement via the sensor 102, the light measurement having a spectral response. To enable intensity scanning and determination of relative sun position, the sensor 102 may be swept across a plurality of positions and/or orientations such that multiple FOVs are captured. In some embodiments, the sensor 102 is included in a mobile device (e.g., mobile phone, tablet, media player, smartwatch, notebook computer, or the like). By way of example, the measured spectral response may include a (non-ideal) spectral response based on wideband UV or visible measurements. The one or more processors 106 may be further configured to provide a spectral correction factor appropriate to contextual information (e.g., time and location) associated with the light measurement of the sensor 102. In some embodiments, the spectral correction factor is based upon a target spectrum relative to the spectral response of the light measurement of the sensor 102 according to a light model appropriate to the contextual information. The target spectrum may include, but is not limited to, UV index, human erythema action spectrum, vitamin D action spectrum, UVA, UVB, carcinoma index, a particular photobiological action spectrum, a human eye color response spectrum (red, green, blue) or color mapping such as XYZ, LUV or LAB, bilirubin photolysis action spectrum, photosynthesis action spectrum, material aging spectrum, sterilization action spectrum, or photocatalytic action spectrum. The one or more processors 106 may be configured to weight the light measurement of the sensor 102 by the spectral correction factor to obtain a target measure. In some embodiments, the one or more processors 106 are further configured to aggregate multiple measurements (possibly at different locations, different angles, or another controlled variable) and/or contextual data inputs to improve accuracy and granularity of the target measure.

Figure 7:
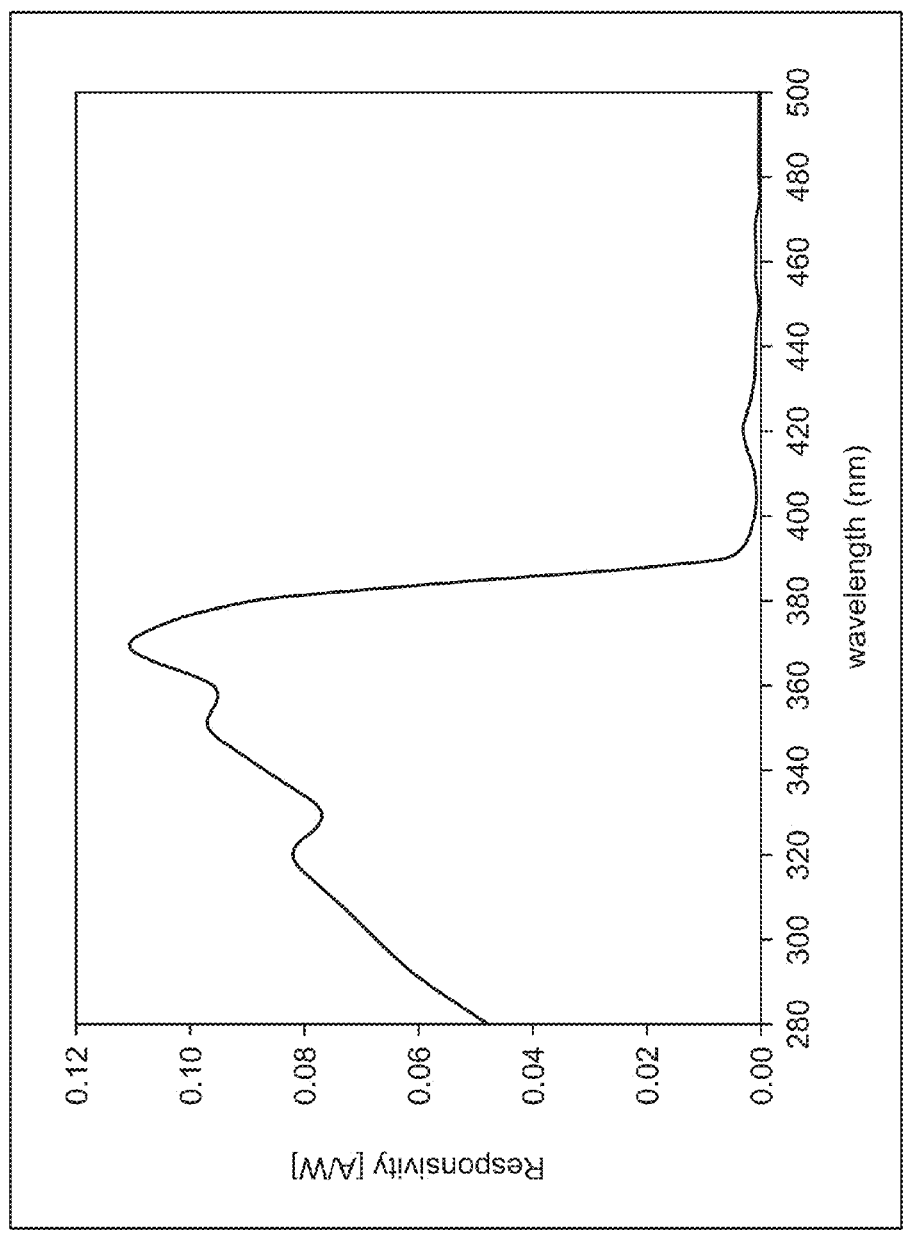
FIG. 7 is a graph showing an exemplary responsivity curve, with responsivity $R(\lambda)$ [A/W] on the y-axis, versus wavelength $\lambda$ [nm] on the x axis.

An exemplary response curve of the sensor 102 is shown in FIG. 7. The sensor response [ADC counts] is the product of the solar irradiance $S(\lambda)$ [Wcm$^{-2}$nm$^{-1}$], sensor area Ar=8.4 e-4 cm$^2$, the ADC gain conversion G (counts/A), sensor responsivity $R(\lambda)$ [A/W], and any additional window transmission $T(\lambda)$ effects summed over the range of sensor wavelengths.

$$\text{UV counts} = G \cdot Ar \int_{280}^{400} d\lambda T(\lambda) S(\lambda) R(\lambda)$$

One advantage of the wideband UV for system integration is that a variety of common phone cover glass materials provide substantial UVA transmission ($T(\lambda) \approx 0.94$), such that the sensor readout is fairly insensitive to the material and thickness of the cover glass or cover lens material.

The spectral intensity of the sunlight can be expressed in a simplified model in terms of the relative distance traveled through the atmosphere (relative to 90 degrees transmission straight down). This amount of atmosphere that sunlight travels through is called "air mass" AM.

$$S(x,y,z,AM,\lambda) \sim e^{-\alpha(\lambda) AM(x,y,z)}$$

In an advanced model the atmospheric extinction coefficient $\alpha(\lambda)$ is derived by considering absorption, mostly from ozone in the upper atmosphere, and Rayleigh scattering from molecules and particles in the lower atmosphere.

Figure 11:
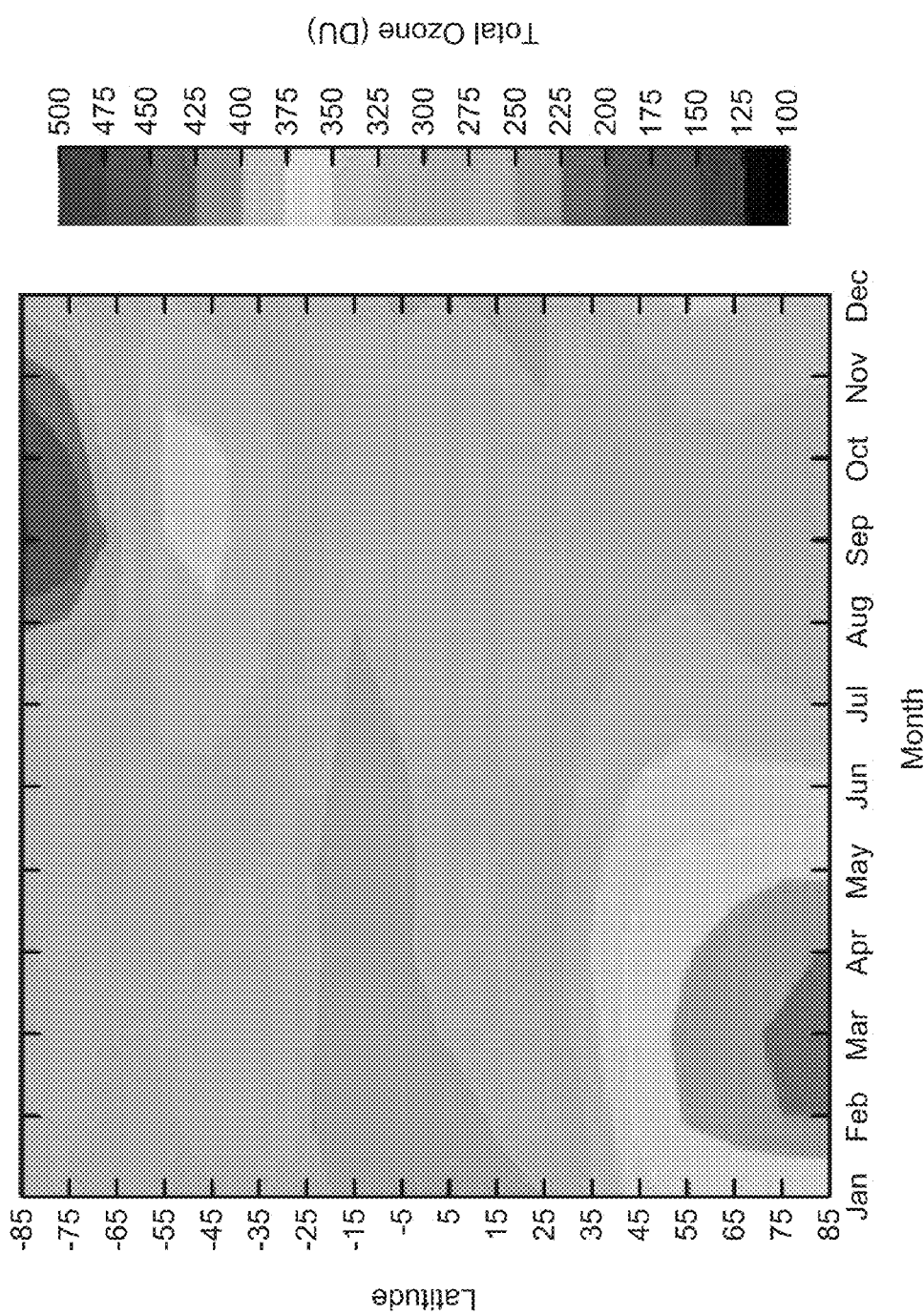
FIG. 11 is a plot showing annual behavior of mean ozone levels by latitude and month.

Given α(λ), it is possible to obtain a series of solar spectra for different amounts of air mass corresponding to solar irradiance at earth's surface at different times of the day. A calculated spectrum is only as general as the solar spectrum it is based on. Local regions have extinction coefficients that differ due to air pressure and seasonal ozone levels. For example, a plot of average ozone levels by latitude and month is shown in FIG. 11. In addition, appropriately ratioed contributions of the unique direct and diffuse light spectra are considered to compensate for differing fields of view of the sensor 102 and an ideal reference meter such that satisfactory correlation is achieved throughout the day and at varied altitudes.

UVA, UVB and UV Index are ideal measures of integrated intensity from subsets of the solar spectrum.

$$UVA = \int_{315}^{400} d\lambda S(\lambda), \quad UVB = \int_{280}^{315} d\lambda S(\lambda), \quad UV\ Index = 0.04 \int_{250}^{400} d\lambda AS(\lambda)S(\lambda)$$

Figure 8:
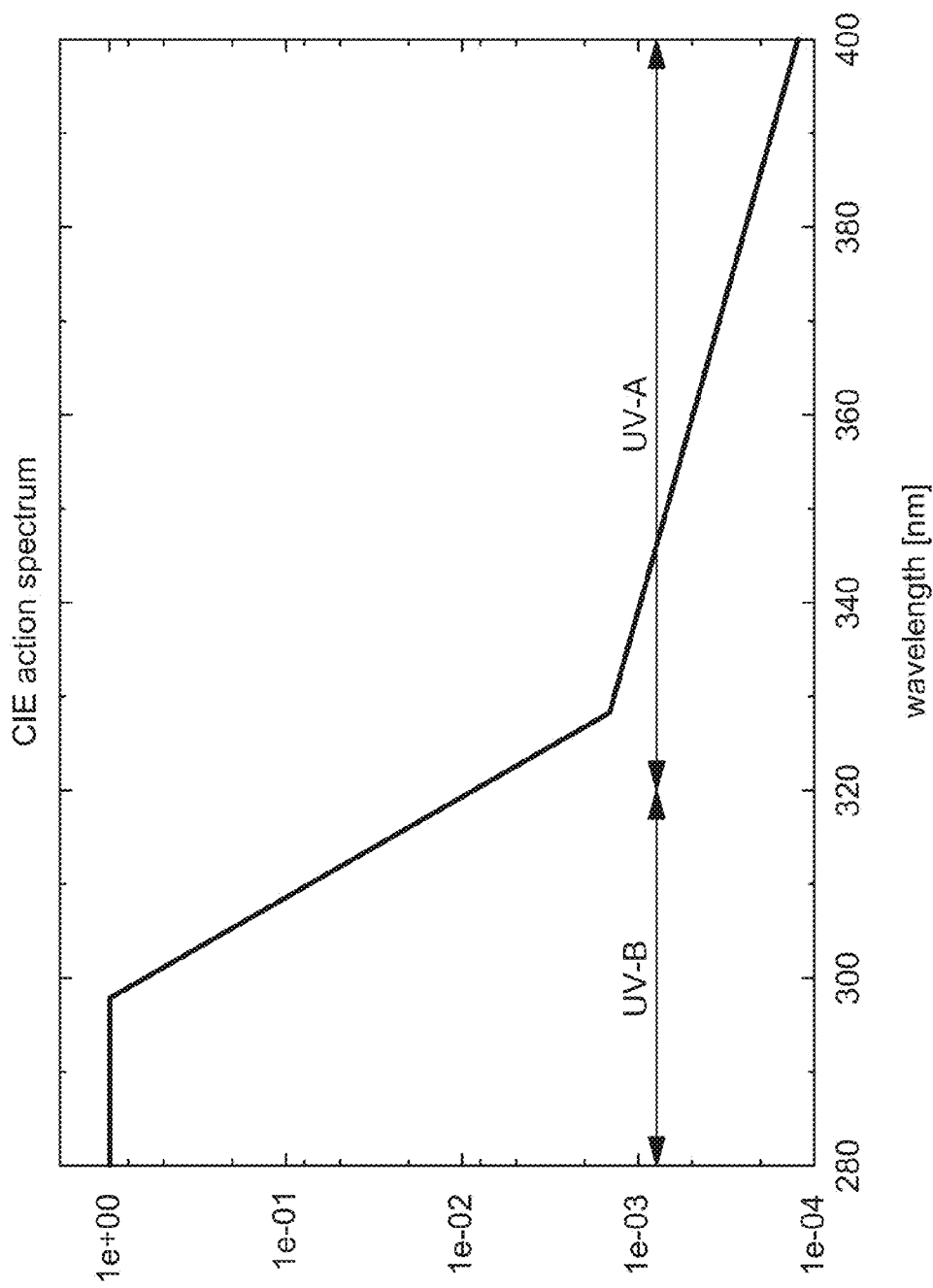
FIG. 8 is a graph showing the human sunburn (erythema) susceptibility spectrum.

AS(λ) is the human Erythema (sunburn) action spectrum, a piecewise function of wavelength [nm], defined below and plotted in log-scale in FIG. 8.

$$AS(\lambda) = \begin{cases} 1, & 250 < \lambda < 298 \\ 10^{0.094(298-\lambda)}, & 280 < \lambda < 328 \\ 10^{0.015(139-\lambda)}, & 328 < \lambda < 400 \end{cases}$$

The calculated UV Index, for a solar spectrum in units of mW/m², may be obtained by multiplying by 0.04 to get a number that falls in the defined 0-15 UV index range. AS(λ) heavily weights high energy UVB rays, such that the UV Index contribution of a typical solar spectrum is about 87% UVB. The UV Index may be accurately detected by either: (1) measuring the total intensity with the precise responsivity defined by AS(λ), or (2) knowing both the light spectrum and total intensity from a known responsivity sensor.

A traditional UV sensor uses method (1) of measuring the total intensity with the precise responsivity defined by AS(λ) to directly detect UV Index. However, a dedicated UVB or UV Index sensor alone does not accurately detect changes in the UVA wavelengths that relate to aging and tanning which appeal to beauty and fashion-conscious consumers and can be challenging and more costly to manufacture and test in high volume.

The approach manifested by system 100 relates to method (2) of knowing both the light spectrum and total intensity from a known responsivity sensor. This approach utilizes a broadband UV measurement to gather total intensity, and a combination of sensor data and accurate solar models to obtain the typical solar spectrum based on contextual information such as, but not limited to, location, elevation, pressure, time of day, and/or time of year. One advantage of this approach is that a simple detector, such as the sensor 102, can leverage existing infrastructure in a mobile handset and a flexible approach that allows estimation of particular UV measures, such as UVA, UVA, UV Index, human carcinoma index, and the like. This approach relies on proven spectral calculation tools developed for NASA and NOAA projects and is supported by extensive global field test validation data. Because the solar spectrum is primarily a function of ozone concentration, angle of the sun in the sky, air pressure (altitude) and the time of day, the sensor 102 may include a simple wideband UV sensor supplemented by retrievable data inputs and predetermined models. For example, an algorithm (e.g., ANDROID, IOS, or WINDOWS framework-based algorithm) may use phone location services (e.g. GPS, Wi-Fi, cell tower triangulation, country code and/or time zone information), clock and/or pressure sensor data to obtain the estimated solar spectrum, and from that spectrum derive a spectral correction factor to relate wideband UV measurements to a variety of biologically relevant parameters, such as UVA, UVB, UV Index (sunburn), and human squamous cell carcinoma (skin cancer) risk curves. The sensor 102 measures UV counts. The algorithm determines how many of those counts come from each UV spectral region, based on the local instantaneous solar spectrum. The spectral correction factor (CF) relates the UV counts to the UV index.

UV Index(calculated)=CF·UV Counts(measured)

In some embodiments, the extended value of the wideband UV measurement is realized with an atmospheric transmission model that estimates the solar spectrum at a particular geo-position and time. Given a wideband UV measure and reference solar spectrum, the relative values of spectral subsets (e.g., UVA, UVB, UV index, carcinoma index) can be estimated. The solar spectrum calculation takes into account factors including, but not limited to, one or more of: latitude, longitude, altitude, sensor field of view (e.g., direct vs. diffuse spectrum), time of year, and time of day. The accuracy of the estimated UVB or UV index depends on how closely the atmospheric transmission matches the model. Latitudinal or local variations in ozone, and to a lesser degree pressure, humidity, and temperature, can also affect the instantaneous accuracy of the atmospheric model.

In some embodiments, the spectral correction Factor (CF) may be based on calculated ideal UV Index and calculated sensor response for the expected solar spectrum.

$$CF = \frac{UV\ Index\ (estimated)}{UV\ counts\ (estimated)}$$

The correction factor can be used to scale the UV counts measured by the sensor 102.

UV Index(calculated)=CF·UV Counts(measured)

The correction factor may be based on calculated ideal UV Index and calculated sensor response for the expected solar spectrum. However, the correction factor may be calculated by alternative criteria and, in general, is based at least partially on the estimated second spectral response (i.e., spectral response based on modeling and contextual information).

Figure 10:
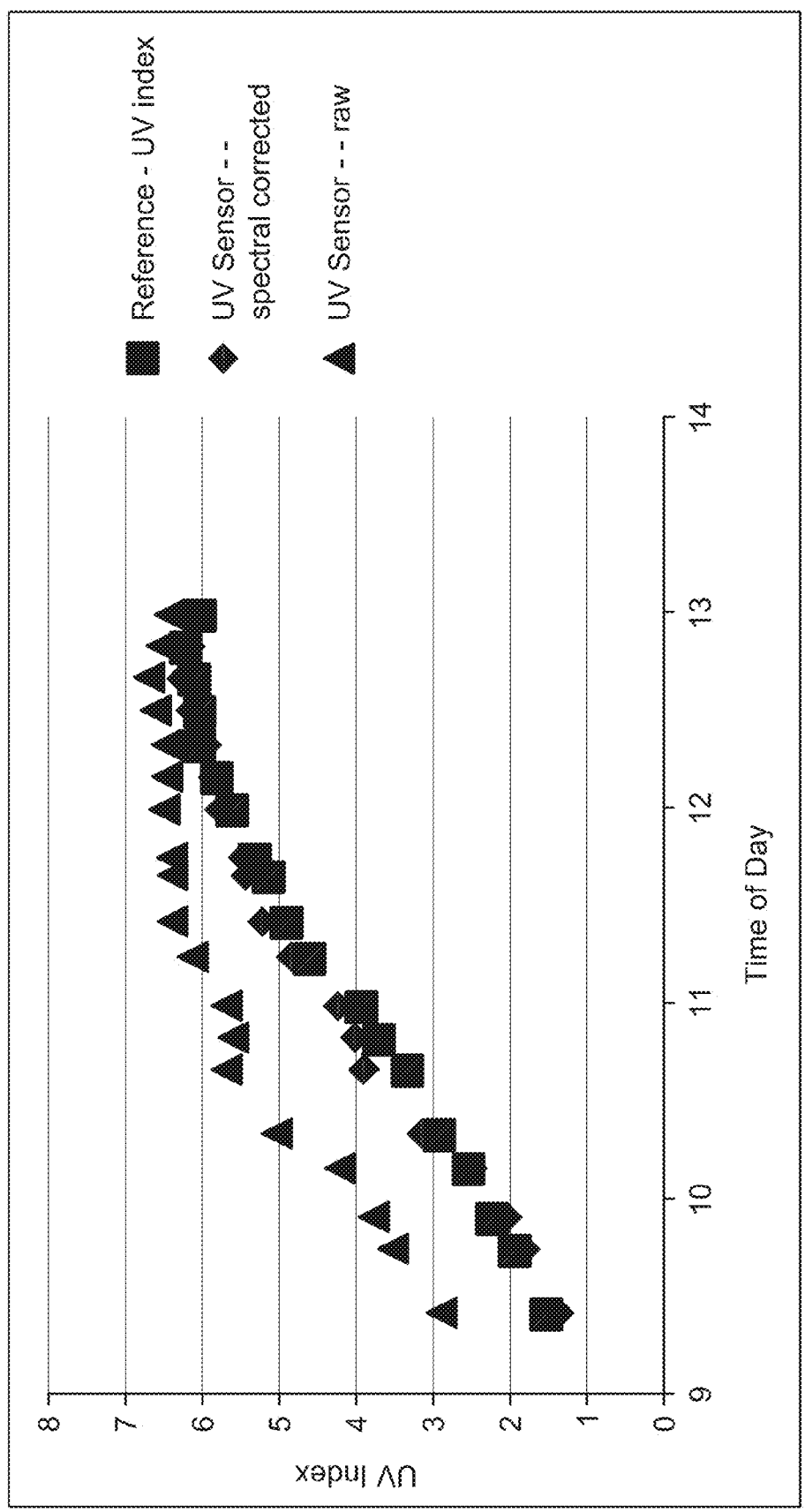
FIG. 10 is a graph showing UV Index measured with a sensor system implemented in accordance with this disclosure (e.g., sensor system shown in FIG. 1) and a reference meter with respect to the time of the day.

An astronomical calculation can be used to find the solar zenith angle (angle from vertical) from position and time information. Altitude may be obtained from a mobile device barometer or OPS service. The correction factor may be determined by the one or more processors 106 (e.g., in an ANDROID, IOS, WINDOWS, or other mobile or personal computing framework) using pre-compiled data tables such as the annual mean ozone concentration by latitude and time of year (as shown in FIG. 10). It is noted however, that any of the functions described herein may be performed by one or more local device processors, cloud-based processing, and/or a mixture of local and remote processors. Accordingly, any mention of "the one or more processors 106" should be understood as including a single processor, a combination of one or more local processors, one or more remote processors, hard coded logic, and/or one or more programmable devices.

Figure 2:
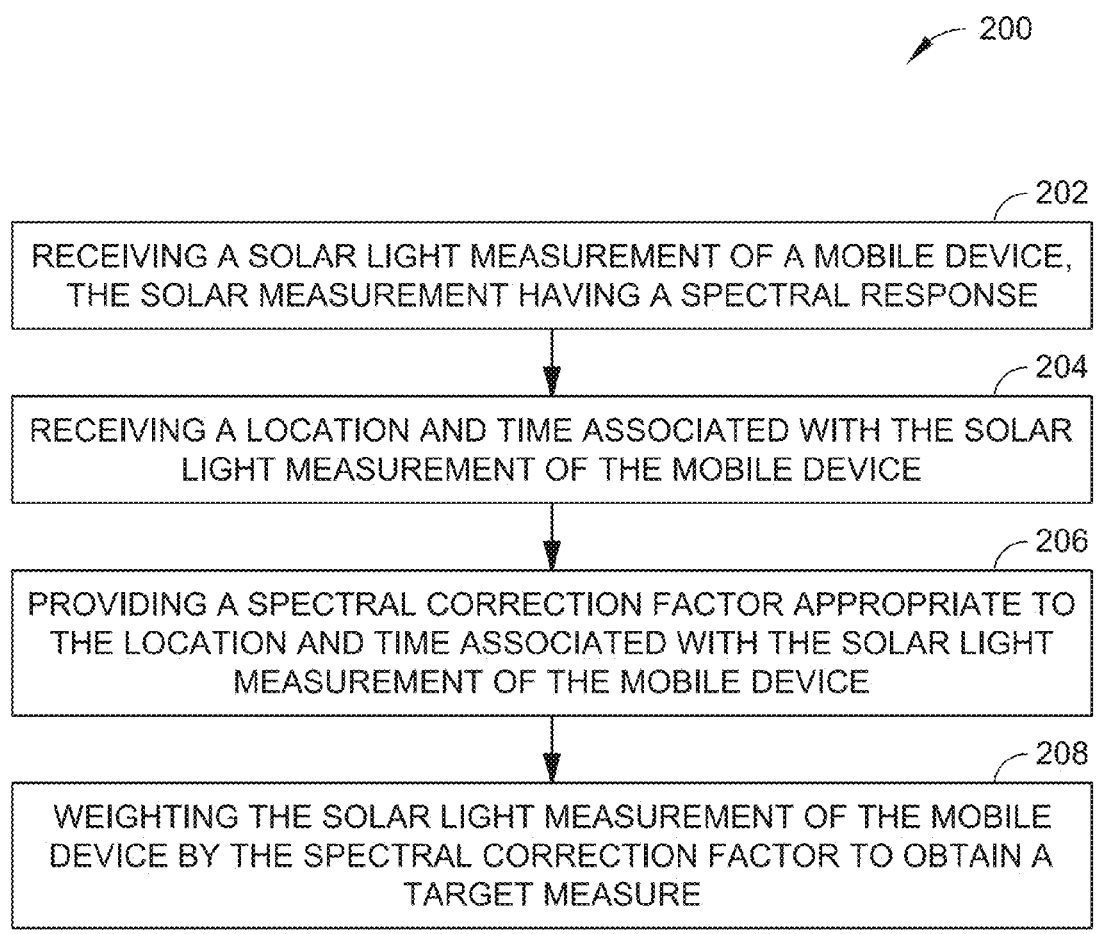
FIG. 2 is a flow diagram illustrating a method of estimating spectral contributions in ambient light in accordance with an embodiment of the present disclosure.

FIG. 2 illustrates a method 200 of estimating spectral contributions in ambient light in accordance with system 100. The method 200 may include the following steps, and in some embodiments, the method 200 may further include steps for carrying out one or more of the operations described herein with regard to system 100. At step 202, the method 200 includes receiving a light measurement of a mobile device, the solar measurement having a spectral response. At step 204, the method 200 includes receiving a location and a time, and in some embodiments, other contextual information (e.g., altitude, orientation, ozone mapping data, and/or pressure). At step 206, the method 200 includes providing a spectral correction factor appropriate to the location and time associated with the light measurement of the mobile device. At step 208, the light measurement is weighted by the spectral correction factor to obtain a target measure. Accordingly, solar contributions at particular wavelengths or ranges of spectra can be estimated to gain accurate information. For example, the estimated spectral contributions may include information regarding light intensity at biologically-relevant spectra. This information may be further paired with associated risks, advisory information, and the like.

An ideal UV index sensor has a cosine angular response which is the response of an ideal flat detector. This type of detector typically has a large dome-shaped plastic diffuser mounted over the top, providing a full width at half maximum (FWHM) FOV of 120 degrees. This extremely wide FOV captures light from the entire sky and provides accuracy in all weather conditions ranging from direct sunlight at high altitude to diffuse, omnidirectional light under thick clouds. However, a dome diffuser and its form factor are not attractive for embedded applications in mobile devices (e.g., cell phones, tablets, notebooks). Furthermore a wide FOV sensor is quite sensitive to changes in light at wide angles, such as the distance to a user's head, which blocks some indirect light from reaching the sensor (resulting in a "shadow effect") and can lead to user confusion as they attempt to move the sensor to obtain a stable reading.

Figure 13:
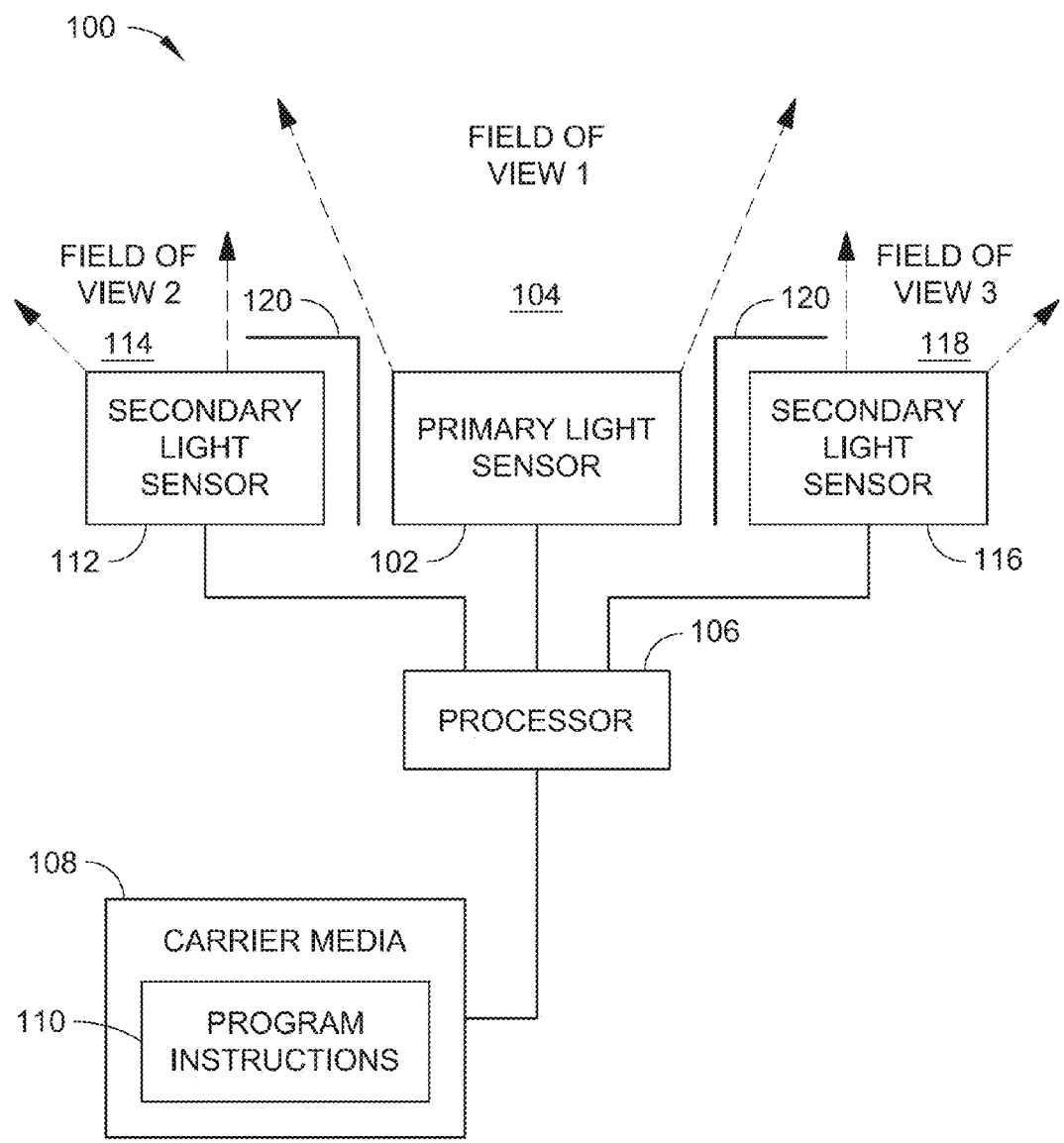
FIG. 13 is a block diagram illustrating a system for estimating spectral contributions in ambient light in accordance with an embodiment of the present disclosure, wherein the system further includes at least two secondary light sensors for detecting light within additional fields of view different from the field of view of the primary sensor.
Figure 14:
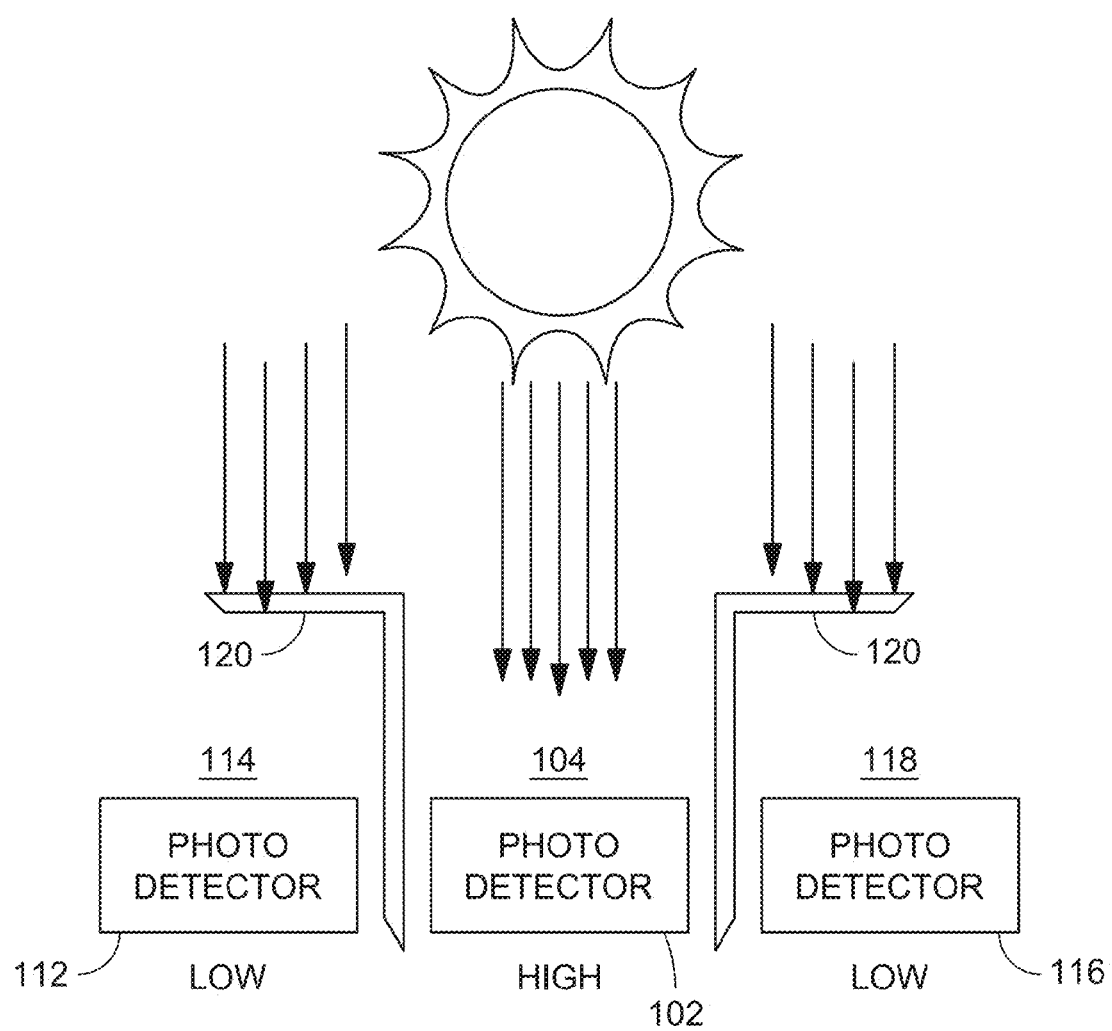
FIG. 14 illustrates solar rays propagating relative to the system of FIG. 13 within an environment substantially free of cloud cover.

A narrow FOV is less sensitive to nearby objects like a user's body, tree, or building, thus resulting in better accuracy for mobile devices. For narrow FOV (e.g., ≤90 degrees), the sensor 102 should be oriented towards the sun for an accurate reading. However, in cloudy and partly cloudy situations a narrow FOV sensor misses some indirect light and will measure lower than a reference meter. This is true for all sensors with limited FOV whether UVA, UVB, UV Index or wideband UV. A balance between narrow FOV for improved UV index and wide FOV for accuracy may be achieved with the first sensor by using secondary sensors (e.g., as shown in FIG. 13) to estimate and compensate for FOV-based error in cloudy conditions. FOV correction may be further applied to compensate for FOV-based error resulting from objects, people, and/or device structures (e.g., cover window or reflective surfaces).

Figure 9:
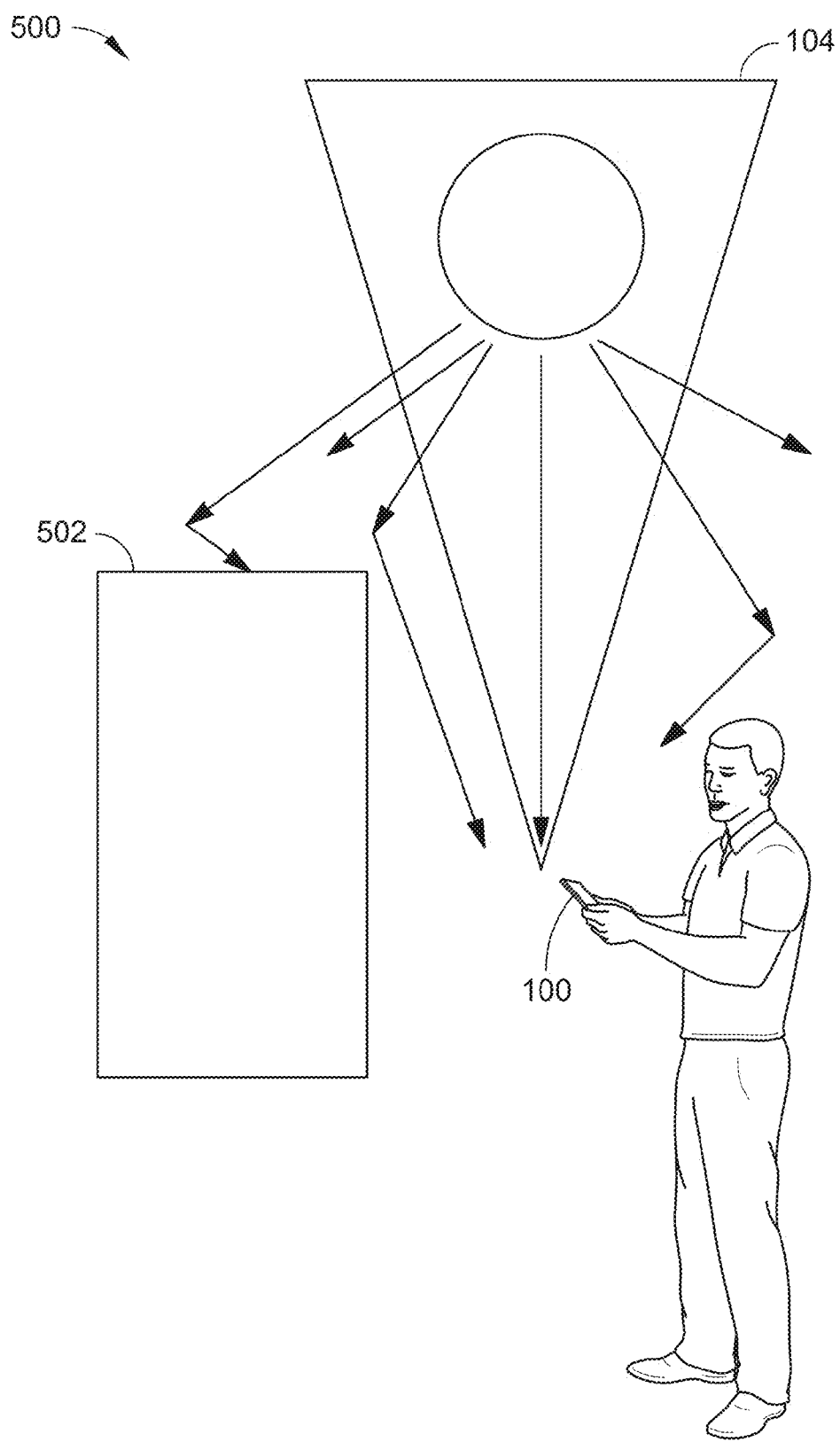
FIG. 9 illustrates an exemplary environment including one or more structures that block, reflect, or scatter light.

The advantage of using a first sensor 102 with a narrow FOV is illustrated in FIG. 9, where the system 100 is included in a mobile device. In the exemplary environment 500, obstacles such as structure 502 do not significantly affect the measurement accuracy of the first sensor 102 as long as they are not within the first FOV 104. In other contexts, an FOV correction factor (e.g., cloud correction factor "CC") may be used to scale the UV counts measurement collected by the first sensor 102.

UV Index(calculated)=CF·UV Counts(measured)*CC

Figure 12B:
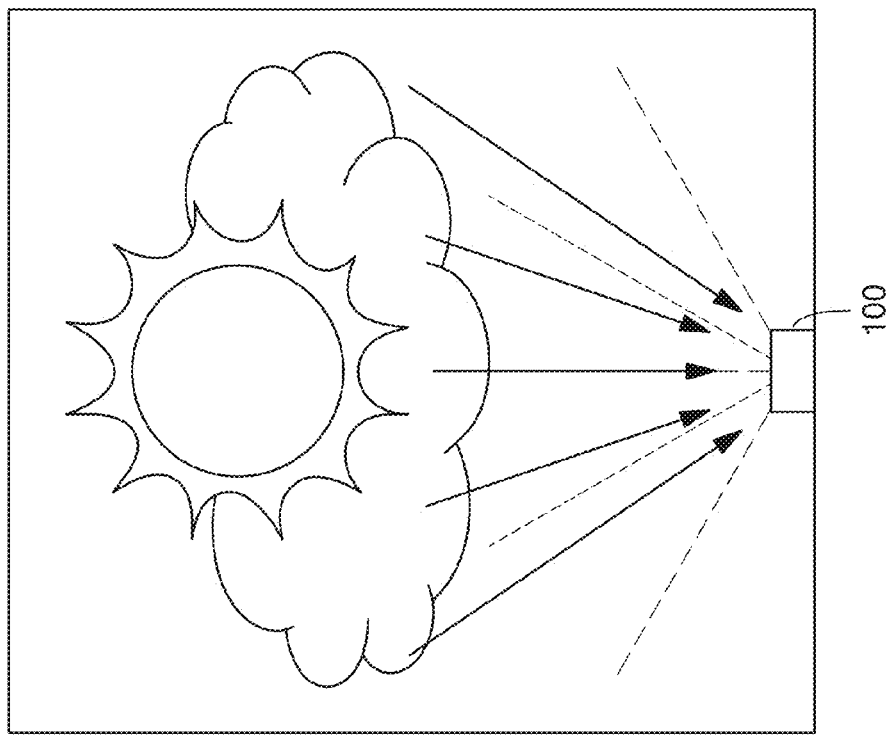
FIG. 12B illustrates solar rays propagating within an environment affected by cloud cover.
Figure 12A:
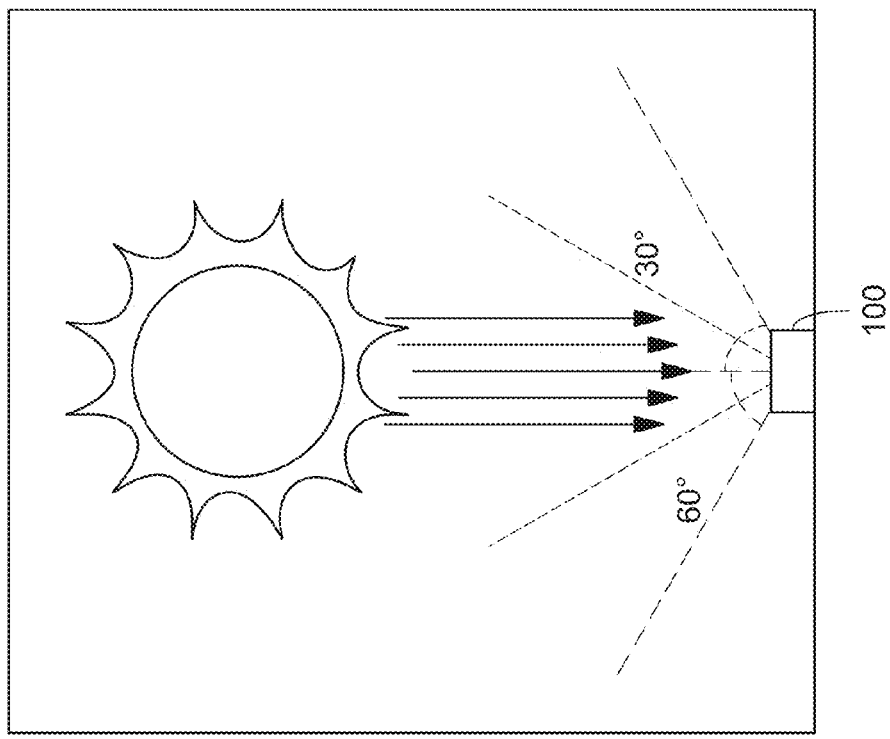
FIG. 12A illustrates solar rays propagating within an environment substantially free of cloud cover.

Limited FOV reduces UV signal captured in cloudy conditions relative to the wide angle reference meter. Detection and correction is needed for high accuracy in haze, clouds, fog, or similar light scattering conditions. FIGS. 12A and 12B illustrate the difference between UV signal captured in sunny and cloudy conditions. A reference meter has a much larger FOV and is capable of capturing scattered light in cloudy and non-cloudy conditions. Whereas, the first sensor 102 may have a narrow FOV (e.g., less than 90°) that excludes portions of scattered light.

As shown in FIG. 13, the system 100 may include one or more secondary light sensors to detect presence of scattered light outside of the first FOV 104. For example, the system 100 may include a second sensor 112 configured to detect light within a second FOV 114 that is different from the first FOV 104. The system 100 may further include a third sensor 116 configured to detect light propagating within a third FOV 118 that is different from the first FOV 104 and the second FOV 114. In some embodiments, the second sensor 112 and the third sensor 116 may be partially covered or shaded by one or more shielding structures 120 (e.g., metal shields). In some embodiments, the secondary sensors 112 and 116 may include photo-detectors exhibiting different spectral responsivity than the first sensor 102. For example, the secondary sensors 112 and 116 may be configured to detect a range of visible light spectra, while the first sensor 102 is configured to detect a range of UV light spectra. The one or more processors 106 may be communicatively coupled with the second sensor 112 and the third sensor 116 and may be configured to weight the light measurement of the first sensor 102 with a FOV correction factor based upon the detected light within the second FOV 114 and the third FOV 118.

When no clouds are detected (i.e., light detected in the second FOV 114 and the third FOV 118 is insubstantial), no FOV correction is applied to the UV signal captured by the first sensor 102. For example, FIG. 14 includes a schematic representation of the light shielding structures 120 on the first sensor 102 which receive primarily light incident at high angles. The first sensor 102 may include silicon photodiodes with broadband, wide angle response. The secondary sensors (i.e., the second sensor 112 and the third sensor 116) may include broadband silicon photodiodes as well; however, the angular response function of each secondary sensor peaks away from zero.

Figure 15:
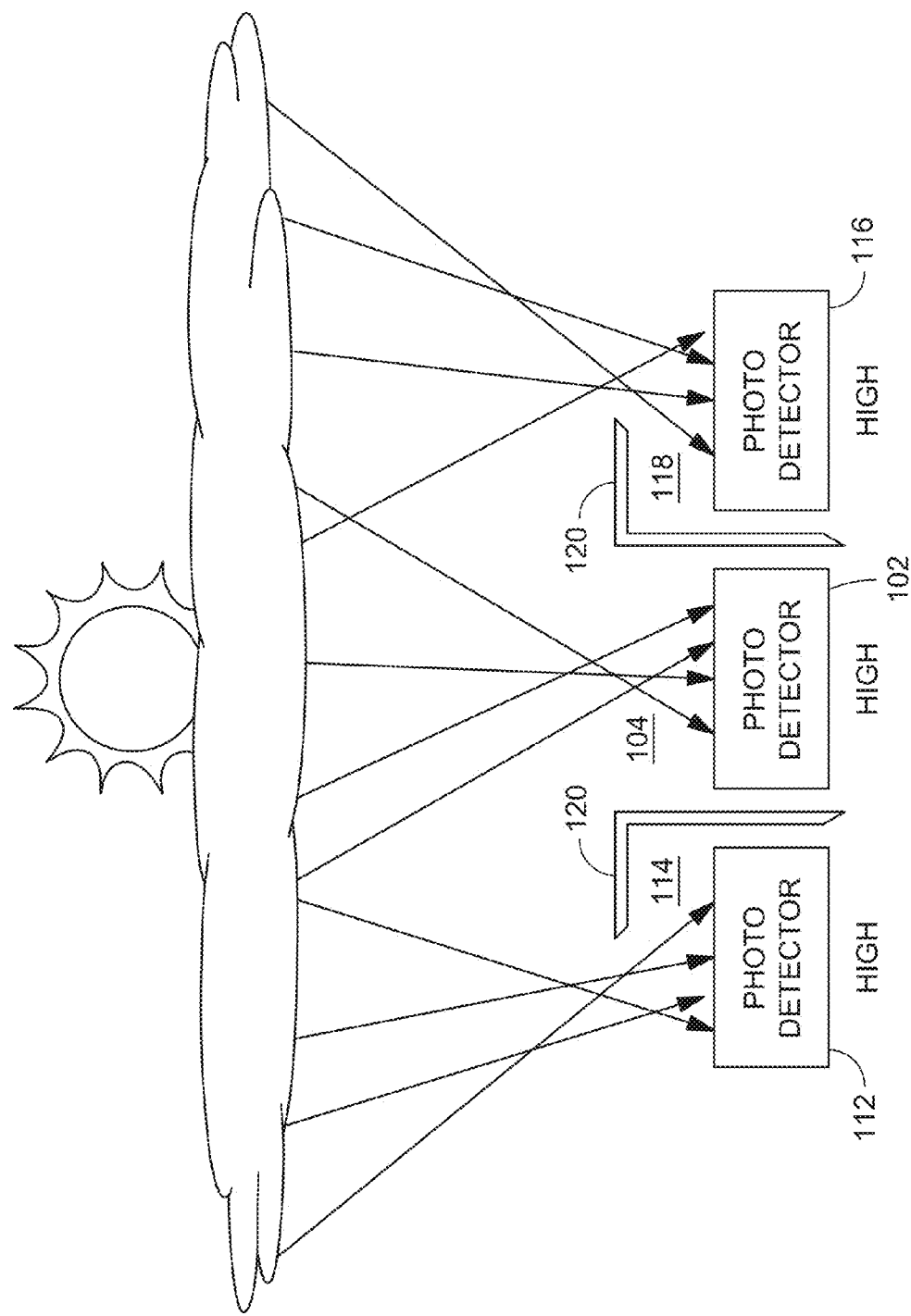
FIG. 15 illustrates solar rays propagating relative to the system of FIG. 13 within an environment affected by cloud cover.

When clouds are detected, UV rays may be scattered in random directions. This may cause the first sensor 102 to detect signals at high concentrations but not account for significant portions of scattered light that are not within the first FOV 104. For example, FIG. 15 illustrates the randomness of UV ray scattering that may occur in cloudy conditions. Based on the levels of light detected within the second FOV 114 and the third FOV 118 by the second sensor 112 and the third sensor 116, respectively, relative to the level of light detected by the first sensor 102, the one or more processors 106 may determine a FOV correction factor. The FOV correction factor may be scaled to account for cloud cover or for other light scattering, reflecting, or blocking surfaces. For example, light scattering, reflecting, or blocking surfaces may include, but are not limited to, fog, haze, smog, smoke, rain, snow, natural or manmade structures, people, animals, vehicles, or device structures.

Figure 16:
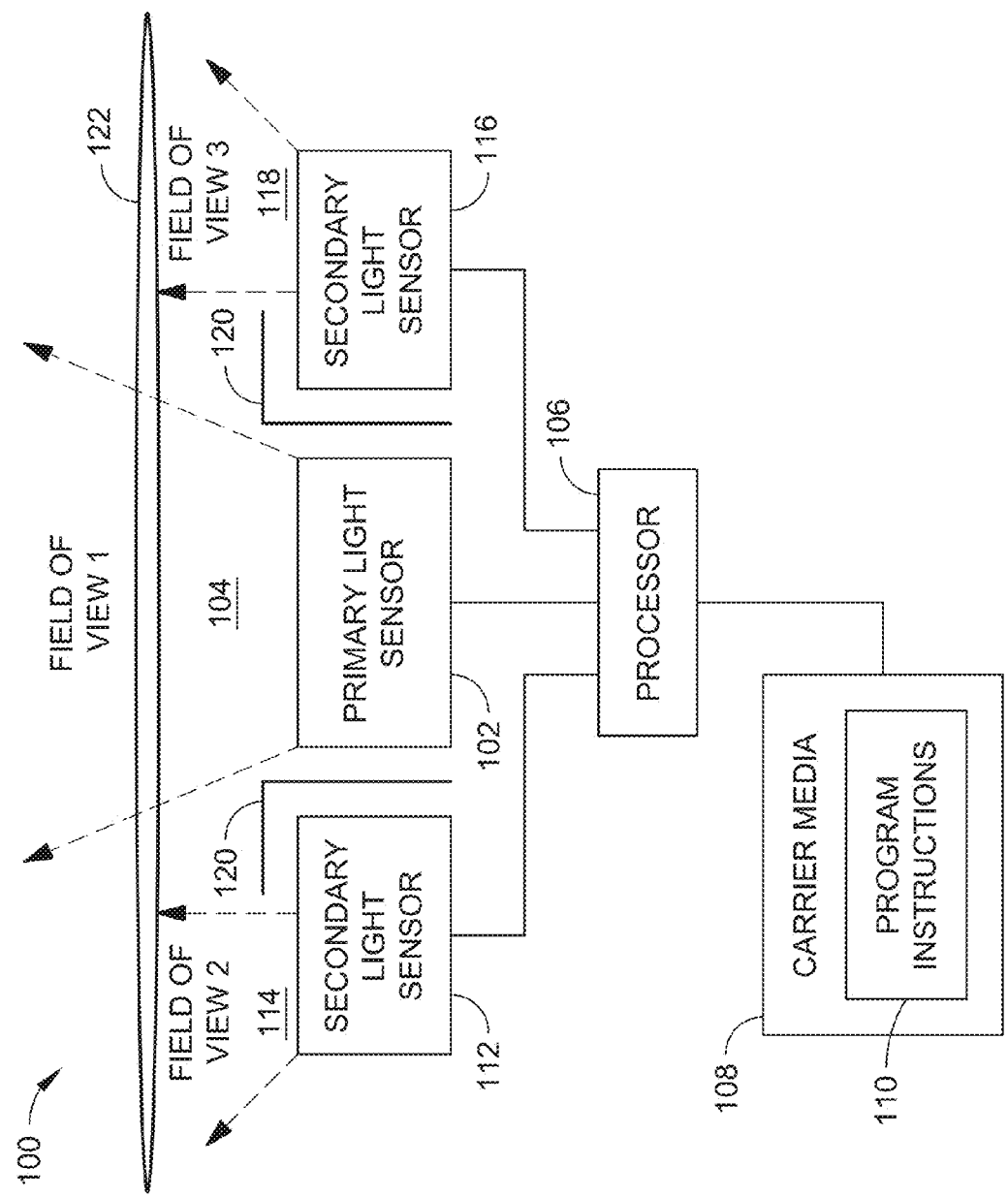
FIG. 16 is a block diagram illustrating a system for estimating spectral contributions in ambient light in accordance with an embodiment of the present disclosure, wherein the system includes a cover window positioned above a primary light sensor of the system.

Some device structures are known to scatter and/or reflect light at certain incident angles. For example, as shown in FIG. 16, a cover window 122 may be positioned adjacent to (e.g., above) the first sensor 102. This configuration may result in reflectance or scattering of light at certain angles. To compensate for the lost signal (i.e., undetected portions of light), the FOV correction factor can also be scaled to compensate for effects of the cover window 122 and/or other light scattering or reflecting device structures.

Figure 18:
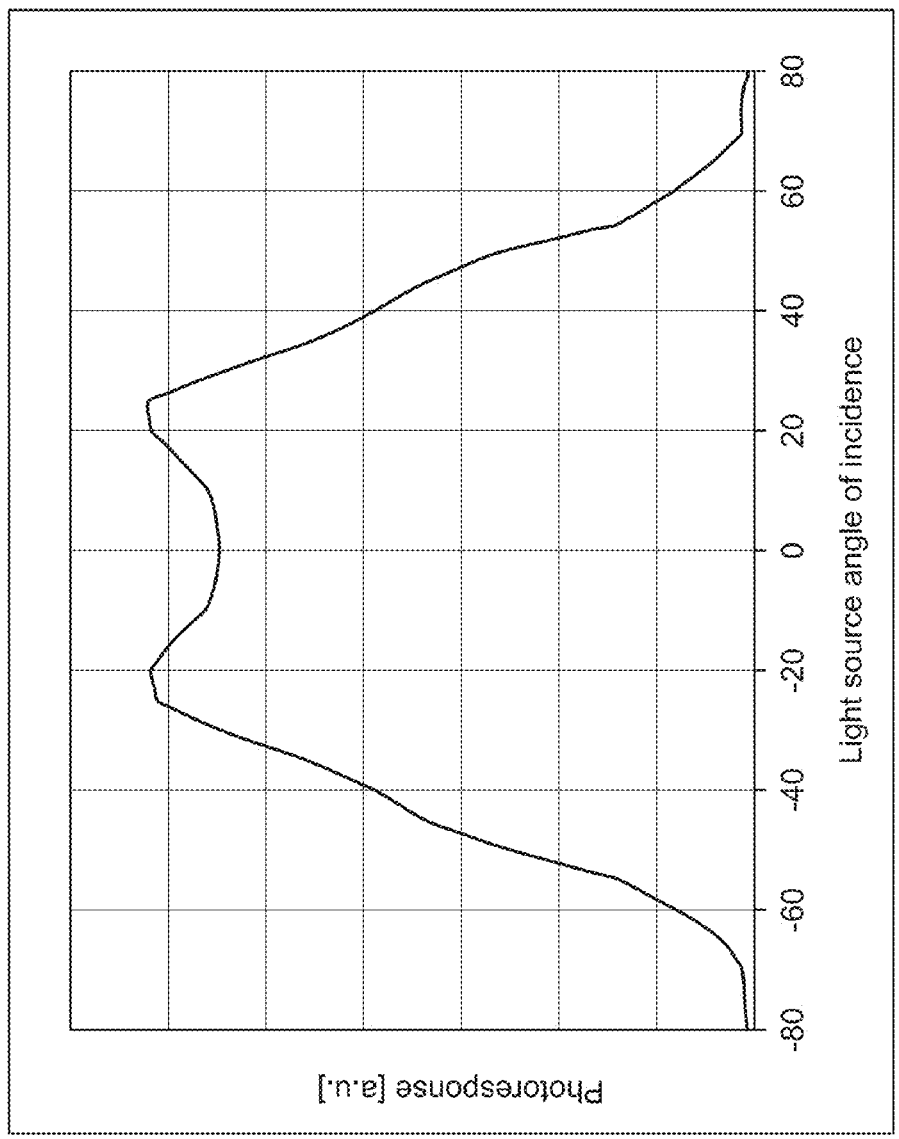
FIG. 18 is a graph showing an exemplary response curve for gesture photodiode detector.

FIG. 18 shows an exemplary angular response curve of a secondary sensor (e.g., sensor 112 or sensor 116). In an exemplary implementation, the angular response curve of the first sensor 102 (not shown) may peak at normal incidence and may have approximately cosine-like response within package FOV. For light centered on-axis, the ratio of light level detected by the secondary sensors to the light level detected by the first sensor 102 is approximately unity. For light with large angular extent (e.g., due to clouds), the ratio increases. The FOV correction factor (e.g., cloud correction factor "CC") may be calculated based on the effective FOV calculated as the ratio of the shielded secondary sensors 112 and 116 (SS) to the unshielded first sensor (FS). That is, FOV=SS/FS*100, with threshold parameter (T) and slope (M).

$$CC = \begin{cases} 1, & \text{if } FOV < T \\ 1 + M(FOV - T), & \text{if } FOV \geq T \end{cases}$$

In sunny conditions, the effective FOV may be in the range of approximately 0.9-1.45. The reading from the first sensor 102 may be more accurate when the light source angular extent is well within the first FOV 104. When the light source extends beyond the sensor first FOV 104 (e.g., effective FOV>threshold), correction is needed. In partly cloudy conditions, the effective FOV may increase to approximately 2. Due to package FOV limitations, in extremely cloudy conditions the effective FOV returns to 1 and the error due to clouds may remain not compensated. However, in these conditions the UV Index is quite low, typically less than 3, and overall error remains less than 1 UV Index points. Exemplary algorithm settings at sea level can include, but are not limited to, T=1.45 and M=0.75. The threshold (T) may be adjusted automatically with altitude to compensate the decreasing angular subtense of the sun in the sky.

Figure 3:
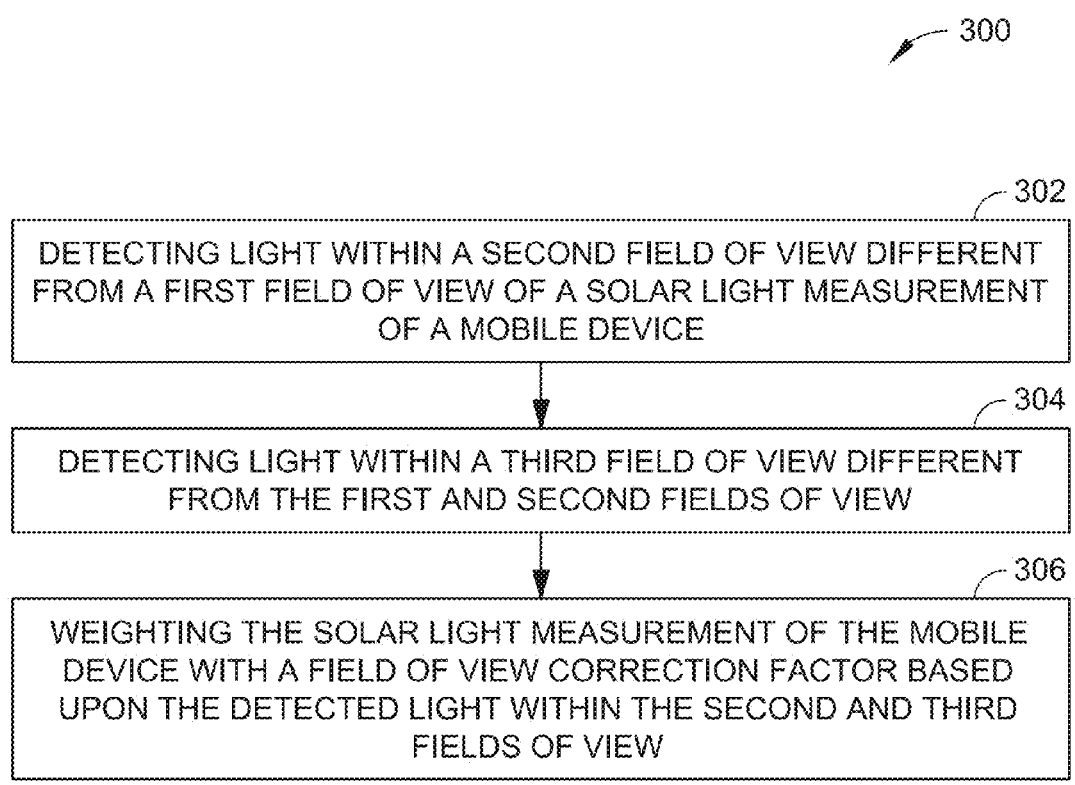
FIG. 3 is a flow diagram illustrating a method of correcting field of view errors affecting measured spectral contributions in ambient light in accordance with an embodiment of the present disclosure.

FIG. 3 illustrates a method 300, in accordance with various embodiments of system 100 described above, of correcting field of view errors affecting measured spectral contributions in ambient light. The method 300 may include the following steps, and in some embodiments, the method 300 may further include steps for carrying out one or more of the operations described herein with regard to system 100. The method 300 may be applied to correct FOV errors (i.e., compensate for limited FOV) in a light measurement of a mobile device. At step 302, the method 300 includes detecting light within a second FOV different from a first FOV of the light measurement of the mobile device. At step 304, the method 300 includes detecting light within a third FOV different from the first and second FOVs. At step 306, the method 300 includes weighting the light measurement of the mobile device with a FOV correction factor based upon the detected light within the second FOV and third FOVs.

Figure 4:
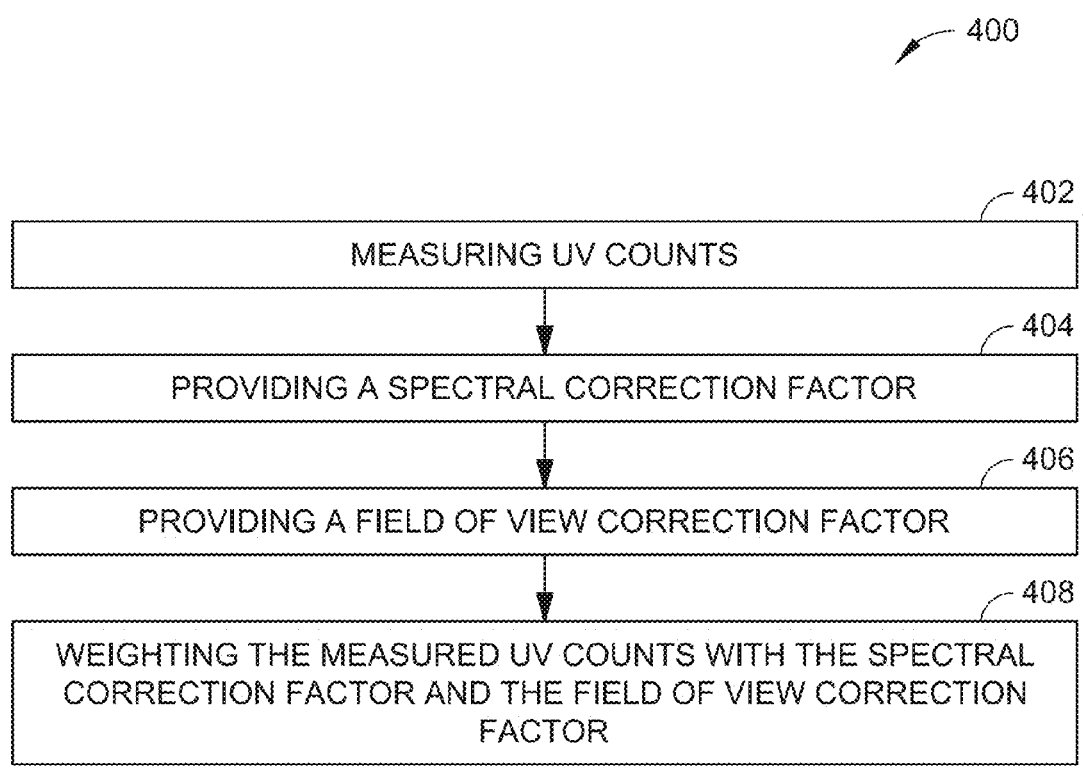
FIG. 4 is a flow diagram illustrating a method of estimating spectral contributions in ambient light and correcting field of view errors affecting the measured spectral contributions in accordance with an embodiment of the present disclosure.
Figure 5:
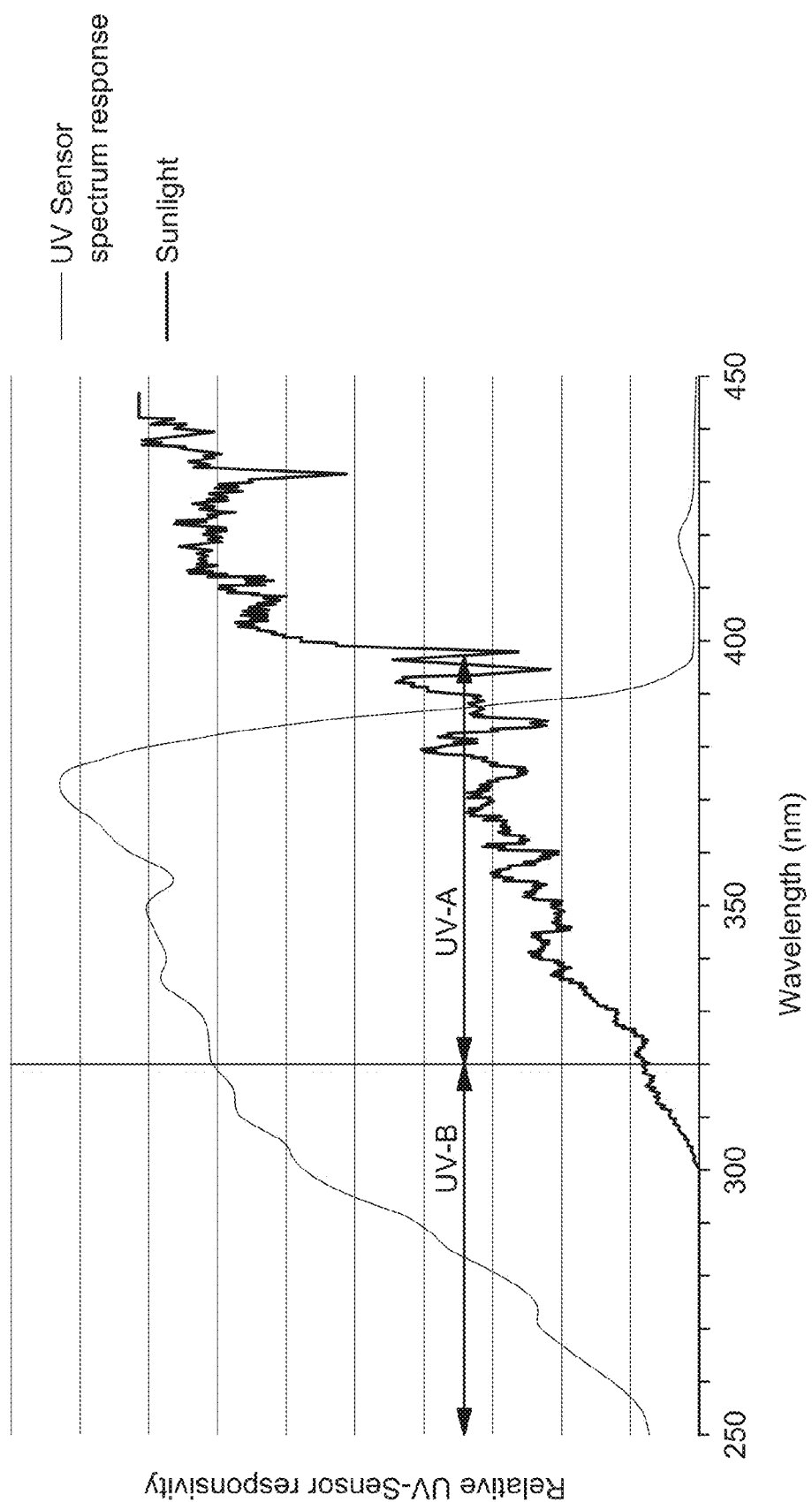
FIG. 5 is a graph showing spectral photocurrent response of a lateral junction photodiode with visible blocking filter overlaid with a solar spectrum.

FIG. 4 illustrates a method 400, in accordance with various embodiments of system 100 described above, of estimating spectral contributions in ambient light and correcting field of view errors affecting measured spectral contributions in ambient light. At step 402, the method 400 includes measuring UV counts (e.g., using a first sensor 102). In some embodiments, the first sensor 102 measures counts proportional to the photocurrent generated from solar radiation on a custom UV sensor die with an integral high efficiency visible blocking filter. At step 404, the method 400 includes determining a spectral correction factor (e.g., as described above with regard to system 100 and method 200). In some embodiments, contextual information (e.g., atmospheric pressure, location, altitude, time, or the like) is retrieved by a processor 106 that then provides a spectral correction factor which determines how many of the measured counts are due to light under a target spectrum (e.g., UV Index or erythema action spectrum). At step 406, the method 400 includes determining a FOV correction factor based on light detected in one or more secondary FOVs (e.g., as described above with regard to system 100 and method 300). In some embodiments, the one or more processors 106 determine to what degree clouds are present from measurements and compensate for differences between the measurements collected via the first sensor 102 and an ideal (cosine) detector, which effectively widens the FOV to improve accuracy in cloudy, partly cloudy conditions, and other light scattering, reflecting, or blocking conditions. At step 408, the method 400 includes weighting the measured UV counts with the spectral correction factor and the FOV correction factor to obtain a target measure, where limited FOV of the mobile device sensor is accounted for to improve measurement accuracy.

Figure 19:
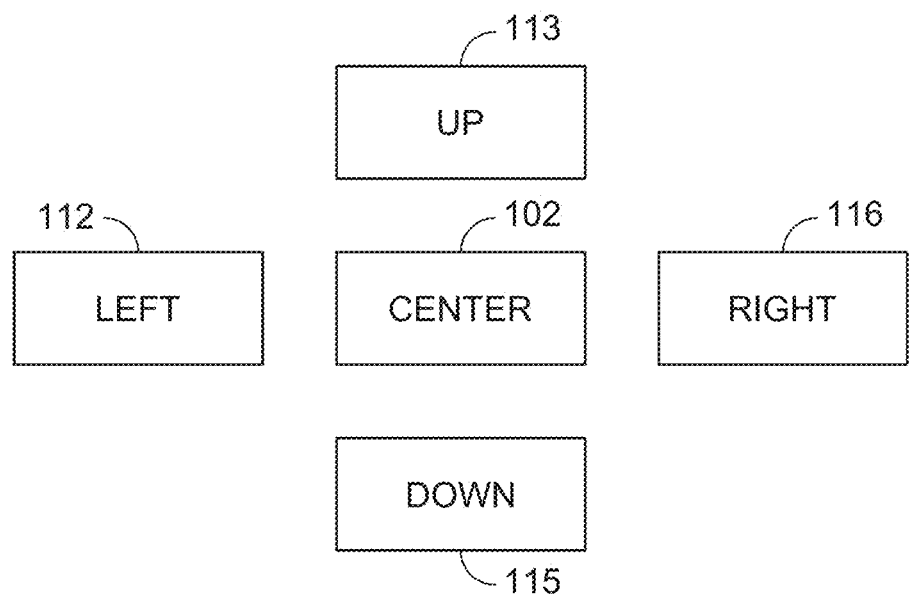
FIG. 19 is a block diagram illustrating a system for estimating spectral contributions in ambient light in accordance with an embodiment of the present disclosure, wherein the system further includes at least four secondary light sensors for detecting light within additional fields of view different from the field of view of the primary sensor.

In some embodiments, the system 100 can further include additional sensors (e.g., fourth, fifth, and so forth) with differing fields of view, where the correction factor is based on measurements from some or all of the secondary sensors. For example, an embodiment of the system 100 is shown in FIG. 19, where the first sensor 102 forms a center channel and additional sensors 112, 113, 115, and 116 form left, up, down, and right channels, respectively. The light intensity detected by each of the secondary sensors (e.g., sensors 112, 113, 115, and 116) can be normalized by dividing each channel measurement by the sum of the secondary channel measurements or by dividing each channel measurement by light intensity detected by the center channel 102 or by another light sensor near the secondary sensors. Any of the sensor configurations described herein can be applied to measuring spectra or other characteristics of any light source (not only solar measurements). For example, the system configurations and methods described herein can also be used to measure spectral contributions from fluorescent, incandescent, LED sources, and the like. Moreover, angle-dependent weighting and correction of measurements can be extended to color correction. For example, light detected at secondary sensors can be used to determine a color correction factor that can be applied to color spectral measurements (e.g., the center channel 102 may be a color sensor array).

In some implementations, the FOV correction factor can be calculated to correct for an error in the centration of the light source in the detector field of view (e.g., cases where most of the light is coming off-axis where the sensor is less responsive than on-axis). The FOVs of secondary detectors may allow for a differential reading. For example, left 112, right 116, up 113 and down 115 facing detectors normalized by the sum of the responses (or by a central detector 102 or another nearby detector) can allow for differential estimation of the light source angle. In some implementations, the FOV correction factor calculation may include a measurement of the device's angle relative to the sun. This angle is calculated from difference of the known angle of the sun, based on time and location information, and the angle of the mobile device from the earth surface normal, which may be measured with a 3D accelerometer and a compass incorporated into the mobile device.

Figure 20:
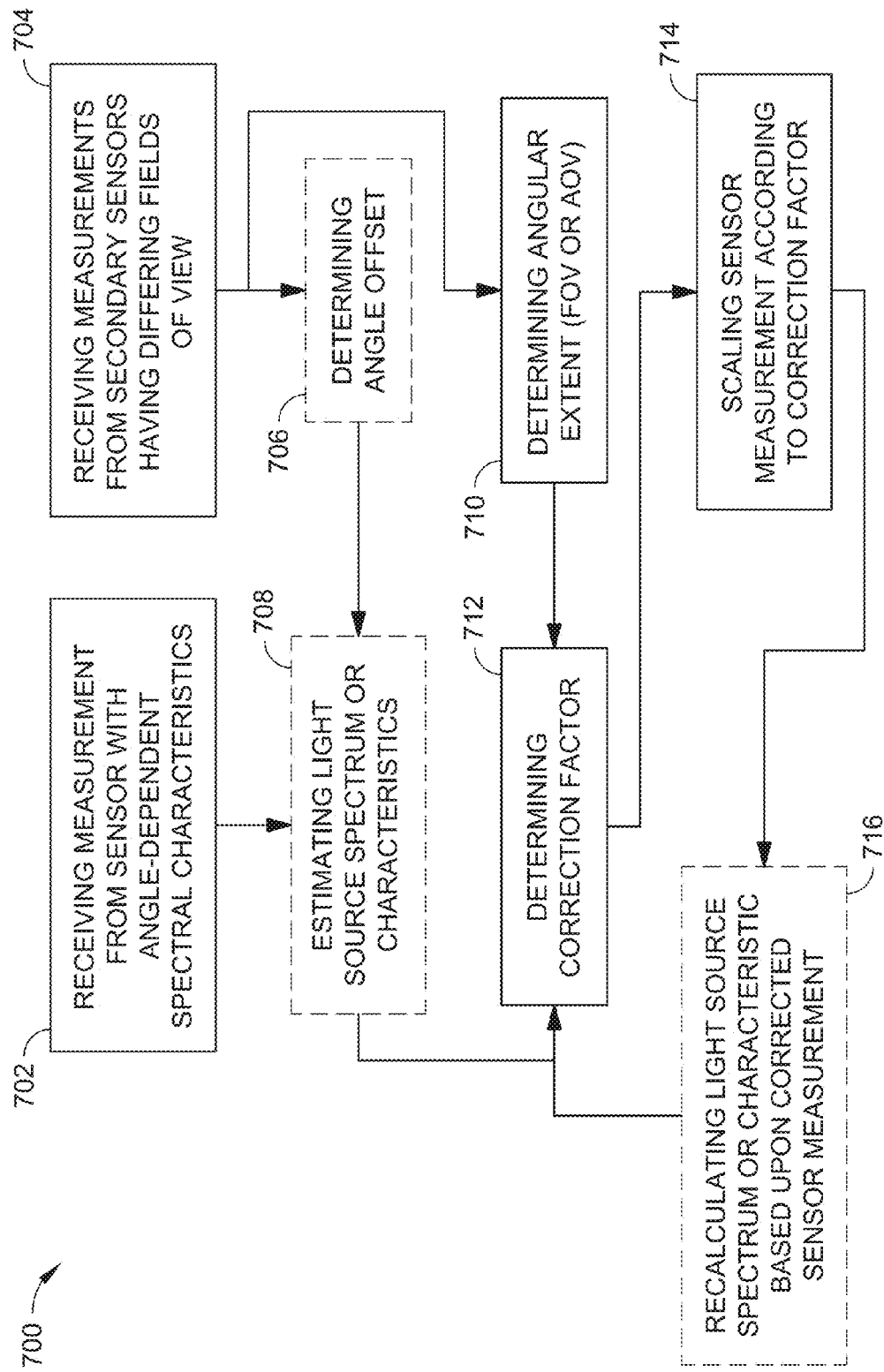
FIG. 20 is a flow diagram illustrating a method of correcting for angle or field of view errors affecting a light or color sensor measurement in accordance with an embodiment of the present disclosure.

FIG. 20 illustrates a method 700, in accordance with various embodiments of system 100 described above, of correcting for angle or field of view errors affecting a light or color sensor measurement. At step 702, a measurement is received from a sensor 102 (e.g., photodetector, UV light sensor, color sensor array, or the like) with angle-dependent sensitivity or spectral characteristics. At step 704, measurements are received from secondary sensors (e.g., left, up, down, and right sensors 112, 113, 115, and 116) having differing fields of view from one another and from the central sensor 102. In some implementations, the method 700 optionally includes (step 706) determining angle offset of the light source (e.g., sun or another single light source). For example, the angle offset can be determined by calculating (L−R)/C and/or (U−D)/C, where L, R, U, D, and C are the left, right, up, down, and central channel measurements, respectively. The method 700 can also optionally include (step 708) estimating light source spectrum or characteristics based on contextual information (e.g., location, time, tilt angle, etc.), or in color sensor array implementations, the method 700 can include receiving a preliminary (uncorrected) spectrum or color correlated temperature (CCT) reading. At step 710, angular extent (e.g., FOV or angle of view (AOV)) of the sensor measurement is determined based upon the secondary sensor measurements. For example, the angular extent can be determined by calculating (L+R+U+D)/C. This works for both single light source measurements and for multiple light source measurements. At step 712, an FOV or AOV correction factor is calculated based on a lookup table (e.g., 2D table correction factor) compared with a CCT reading, or based on a calculated correction factor compared with solar spectrum and detected FOV. At step 714, the sensor measurement is scaled by the FOV or AOV correction factor. The method 700 can also optionally include (step 716) recalculating the light source spectrum or other characteristics based on the corrected sensor measurement.

In some implementations, secondary sensors (e.g., sensors 112, 113, 115, and 116) can also be used to detect and account for obstacles such as people, buildings, cars, clouds, or any other structural or environmental condition that can block light from reaching the sensors as would be expected. For example, the system 100 can be configured to compare the respective measurements of the sensors with one another and with an expected measurement based on a previous measurement, a measurement collected by another (nearby) user, or an expected measurement based upon modeling with contextual information (e.g., time, location, altitude, orientation, etc.). When an object is detected, the measurement can be corrected with mathematical modeling, another measurement can be collected, a user may be notified that an obstacle is affecting the sensor measurement, and/or the user can be advised to reposition the sensors for a more appropriate reading.

In some implementations, solar exposure can be tracked without constant monitoring of the sun. Sunlight changes quickly during the day, especially at the shorter wavelengths where transmission through the atmosphere is particularly sensitive to solar angle. UV Index, for example, between 1-3 hours before or afternoon the UV Index goes up from almost negligible amounts to very close to the daily maximum. So a single measurement of the sun may not be accurate for tracking exposure. Accordingly, continuous monitoring can be desired. The challenge with light monitoring with a mobile device is that the mobile device must be in constant view of the sun, which isn't practical for phones because they are usually put into a pocket or purse and can get hot if left out in the sun. Accordingly, time (T0) and location (L) information can be used to calculate, look up, generate or select an appropriate light intensity curve versus time of day. Because the local solar irradiance depends on albedo, local buildings, trees and especially, ozone concentration, clouds and fog, and the like, the intensity curve is not accurate for all locations but can provide a theoretical value. In implementations, a method takes or receives a light intensity measurement S. The curve is then scaled by the ratio S/E(T0,L) which is then locally accurate for the prediction of the light for short periods of time, or long periods of time if environmental conditions and/or location are not rapidly changing. The exposure is calculated as the integral of the scaled expected intensity curve. Measurements at later times (T1, T2, etc.) can be used to rescale the curve to provide improved accuracy. However, because the light intensity changes so quickly and often predictably, the scaled curve can provide improved accuracy over a point-wise integration. Notably, a single measurement may suffice for a significant portion of the day if conditions are not rapidly changing. The light intensity measurement can be a direct measurement or inferred measurement using time and location information as described herein. This method then functions as a user-location-specific predictive extrapolation, which can be used to set timer limits for UV exposure for tanning or sunburn avoidance. This method can further benefit from the device knowing whether it is indoors or outdoors in the case the user is moves indoors temporarily, so that the integration can be stopped when the user with a mobile device in a pocket goes indoors, for example, and then restarted when the user is outdoors. In this regard, the method can also include a selective integration based on user location (e.g., indoor or outdoor position).

Mobile devices can have additional advantages for light monitoring because they are often connected to a network. In some implementations, a method is provided for light intensity tracking and mapping, where individual light intensity measurements are aggregated and made available to mobile devices or for mobile device users. When users make measurements they can be reported to a server which updates a local UV intensity map, atmospheric gas concentration map, or the like. Spatial interpolation can be used to improve density mapping accuracy for users. Additionally, for predictable measurements (e.g., light characteristics or spectra), predictive extrapolation can also be used. In this manner, a mobile device that is in a user's pocket can integrate a user's potential UV exposure without the user having to take the mobile device out of the user's pocket, but rather, by using interpolated UV Index levels from a reading served by a nearby user. In the absence of a suitable reading, a pure prediction can be used. In some implementations, the server or a local/remote processor may selectively disallow readings from the map that are peculiar using Bayesian techniques in order to improve overall accuracy. The server or a local/remote processor may weight readings from devices that tend to be close to the average (i.e., "good" representative users) or are more frequent or are the highest. The processing can also be server-based, ad-hoc or peer-to-peer.

Figure 17:
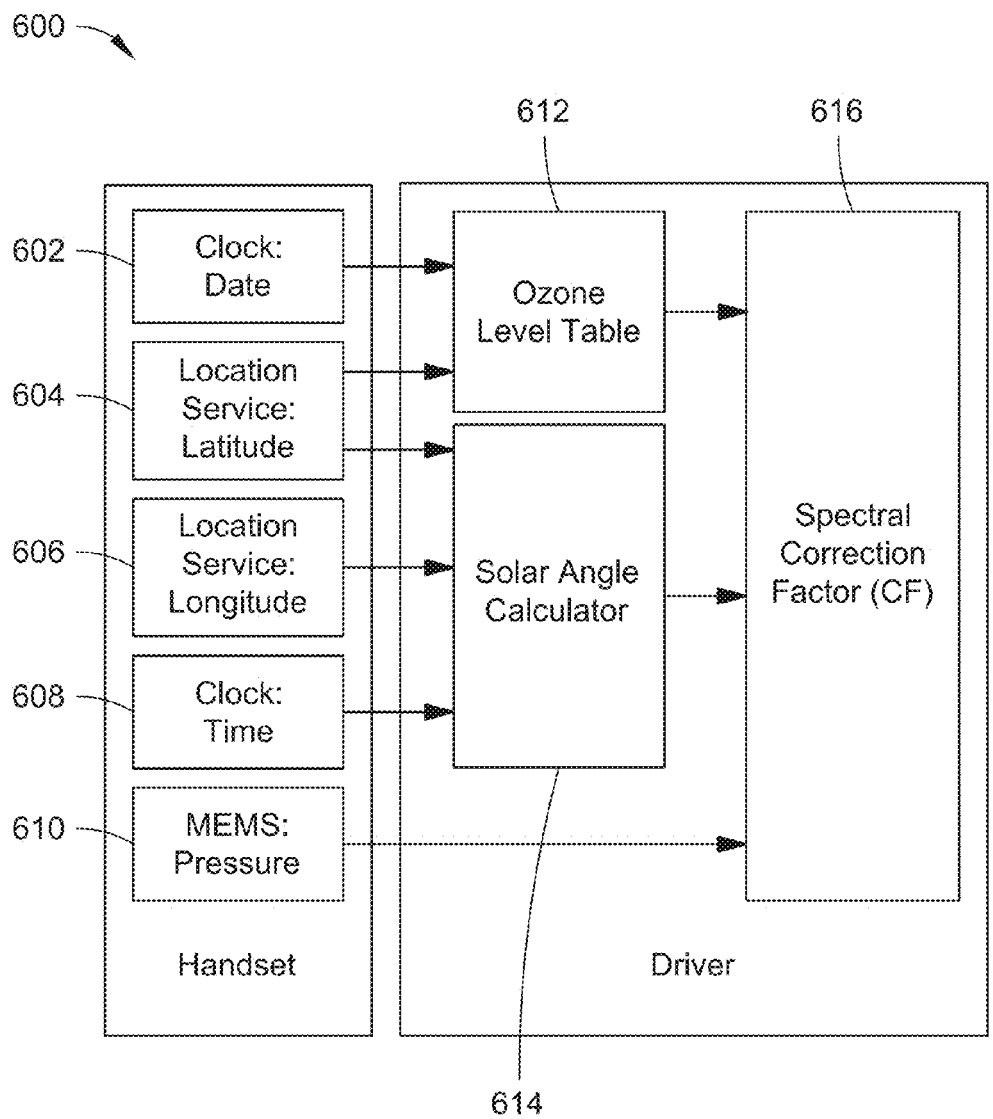
FIG. 17 is a block diagram illustrating a system for estimating spectral contributions in ambient light in accordance with an embodiment of the present disclosure, wherein a mobile handset provides data inputs to an application driver to determine a spectral correction factor.

FIG. 17 is block diagram illustrating an exemplary implementation of various modules on a mobile device 600 (e.g., mobile handset) that feed one or more application drivers. In embodiments, the mobile device 600 includes one or more hardware or software modules (e.g., clock(s)/timer(s) 602 and/or 608, position detector(s)/receiver(s) 604 and/or 606, pressure sensor(s) 610, accelerometer(s), altimeter(s), etc.) configured to detect, determine, or receive contextual information, including, but not limited to, one or more of: time, date, location, altitude, orientation, or atmospheric pressure. At least some of the contextual information can be received from a remote server. For example, the contextual information can include a mixture of sensor data collected by one or more sensors of the mobile device 600 and data received from a remote server. Some contextual information may be at least partially based on or can be adjusted or selected according to the sensor data and/or data received from a remote server. For example, sensor data (e.g., time, date, location, altitude, orientation, and/or atmospheric pressure) can be fed into an ozone level table 612 or a solar angle calculator 614, or other contextual information database or algorithm running on the device 600 or at a remote server. In this regard, an application can be run entirely on the device 600, or can be cloud based, or partially run on-device and partially run on the cloud. The mobile device 600 may include at least one processor or controller configured to feed the contextual information into one or more application drivers, and optionally configured to run one or more applications or application software modules on-device. The on-device or remotely operating (e.g., cloud-based) processor(s) are configured to generate a spectral correction factor (CF) based on the contextual information (e.g., time, date, location, altitude, orientation, atmospheric pressure, solar angle, and/or ozone mapping). This spectral correction factor can then be applied to a detected spectrum (e.g., UV spectral response) in order to obtain a desired (target) spectral measurement.

It should be recognized that the various functions, operations, or steps described throughout the present disclosure may be carried out by any combination of hardware, software, or firmware. In some embodiments, various steps or functions are carried out by one or more of the following: electronic circuitry, logic gates, multiplexers, a programmable logic device, an application-specific integrated circuit (ASIC), a controller/microcontroller, or a computing system. A computing system may include, but is not limited to, a personal computing system, mainframe computing system, workstation, image computer, parallel processor, or any other device known in the art. In general, the terms "controller" and "computing system" are broadly defined to encompass any device having one or more processors, which execute instructions from a carrier medium.

Program instructions implementing methods, such as those manifested by embodiments described herein, may be transmitted over or stored on carrier medium. The carrier medium may be a transmission medium, such as, but not limited to, a wire, cable, or wireless transmission link. The carrier medium may also include a non-transitory signal bearing medium or storage medium such as, but not limited to, a read-only memory, a random access memory, a magnetic or optical disk, a solid-state or flash memory device, or a magnetic tape.

It is further contemplated that any embodiment of the disclosure manifested above as a system or method may include at least a portion of any other embodiment described herein. Those having skill in the art will appreciate that there are various embodiments by which systems and methods described herein can be implemented, and that the implementation will vary with the context in which an embodiment of the disclosure is deployed.

Furthermore, it is to be understood that the invention is defined by the appended claims. Although embodiments of this invention have been illustrated, it is apparent that various modifications may be made by those skilled in the art without departing from the scope and spirit of the disclosure.

What is claimed is:

1. A method of estimating the spectral contributions in ambient light, comprising:
   receiving a light measurement from a first sensor of a mobile device, the light measurement having a spectral response;
   receiving a location and a time associated with the light measurement;
   providing a spectral correction factor appropriate to the location and the time associated with the light measure;
   scaling the light measurement by the spectral correction factor to obtain a target measure;
   detecting light within two or more differing fields of view with at least one secondary sensor of the mobile device, wherein the two or more differing fields of view are at least partially defined by at least one shielding structure disposed between the first sensor and the at least one secondary sensor, wherein the at least one shielding structure covers a partial portion of a sensor area of the at least one secondary sensor; and
   scaling the light measurement with a correction factor based upon the light detected within the two or more differing fields of view, wherein the correction factor is determined based on levels of the light detected within respective ones of the two or more differing fields of view relative to a level of light detected within a first field of view of the first sensor.

2. The method of claim 1, wherein the spectral correction factor is based upon a target spectrum relative to the spectral response of the light measurement, according to a light model appropriate to the location and the time associated with the light measurement.

3. The method of claim 2, wherein the target spectrum comprises at least one of: an UV index, a visible color spectrum, human erythema action spectrum, a vitamin D action spectrum, an UVA spectrum, an UVB spectrum, a carcinoma index, a photobiological action spectrum, a photosynthesis action spectrum, a material aging spectrum, a sterilization action spectrum, or a photocatalytic action spectrum.

4. The method of claim 2, wherein the time includes a time of day and a time of year.

5. The method of claim 2, wherein the light model is further based upon an altitude associated with the light measurement.

6. The method of claim 2, wherein the light model is further based upon an atmospheric pressure associated with the light measurement.

7. A system for estimating spectral contributions in ambient light, comprising:
   a first sensor configured to detect light within a first field of view;
   two or more secondary sensors configured to detect light within two or more differing fields of view, wherein the two or more differing fields of view are at least partially defined by at least one shielding structure disposed between the first sensor and at least one secondary sensor of the two or more secondary sensors, wherein the at least one shielding structure covers a partial portion of a sensor area of the at least one secondary sensor; and
   one or more processors configured to:

receive a light measurement via the first sensor, the light measurement having a spectral response;

receive a location and a time associated with the light measurement of the first sensor;

provide a spectral correction factor appropriate to the location and the time associated with the light measurement of the first sensor;

scale the light measurement of the first sensor by the spectral correction factor to obtain a target measure, wherein the spectral correction factor is based upon a target spectrum relative to the spectral response of the light measurement of the first sensor according to a light model appropriate to the location and the time associated with the light measurement of the first sensor; and scale the light measurement of the first sensor with a correction factor based upon the light detected within the two or more differing fields of view, wherein the correction factor is determined based on levels of the light detected within respective ones of the two or more differing fields of view relative to a level of the light detected within the first field of view.

8. The system of claim 7, wherein the target spectrum comprises at least one of: an UV index, a visible color spectrum, human erythema action spectrum, a vitamin D action spectrum, an UVA spectrum, an UVB spectrum, a carcinoma index, a photobiological action spectrum, a photosynthesis action spectrum, a material aging spectrum, a sterilization action spectrum, or a photocatalytic action spectrum.

9. The system of claim 7, wherein the time includes a time of day and a time of year.

10. The system of claim 7, wherein the light model is further based upon an altitude associated with the light measurement of the first sensor.

11. The system of claim 7, wherein the light model is further based upon an atmospheric pressure associated with the light measurement of the first sensor.

* * * * *